(12) United States Patent
Wu et al.

(10) Patent No.: US 11,500,493 B2
(45) Date of Patent: Nov. 15, 2022

(54) ELECTRONIC DEVICE

(71) Applicant: GUANGDONG OPPO MOBILE TELECOMMUNICATIONS CORP., LTD., Guangdong (CN)

(72) Inventors: Anping Wu, Guangdong (CN); Le Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/367,058

(22) Filed: Jul. 2, 2021

(65) Prior Publication Data

US 2021/0333928 A1    Oct. 28, 2021

Related U.S. Application Data

(63) Continuation of application No. PCT/CN2019/094108, filed on Jun. 30, 2019.

(30) Foreign Application Priority Data

Feb. 1, 2019  (CN) .......................... 201910104865.5
Feb. 1, 2019  (CN) .......................... 201910105493.8

(51) Int. Cl.
*G06F 3/042*   (2006.01)
*G06F 3/041*   (2006.01)
(Continued)

(52) U.S. Cl.
CPC ........ *G06F 3/0428* (2013.01); *G06F 3/04182* (2019.05); *G06V 40/1318* (2022.01);
(Continued)

(58) Field of Classification Search
CPC . G06F 3/0428; G06F 3/04182; H04N 5/2353; H04N 5/232; H04N 5/243; G06V 40/1318; G06V 40/136
(Continued)

(56) References Cited

U.S. PATENT DOCUMENTS 7,277,563 B2   10/2007  Chou
10,102,411 B2  10/2018  Lillie et al.
(Continued)

FOREIGN PATENT DOCUMENTS

CN   106326855 A   1/2017
CN   106908985 A   6/2017
(Continued)

OTHER PUBLICATIONS

SIPO, First Office Action for CN Application No. 201910104865.5, dated Dec. 29, 2020.
(Continued)

*Primary Examiner* — Jimmy H Nguyen
(74) *Attorney, Agent, or Firm* — Hodgson Russ LLP

(57) ABSTRACT

An electronic device, including: a display panel, including a fingerprint recognition region, the fingerprint recognition region including a central region and an edge region surrounding the central region; an optical sensor, configured to collect a fingerprint image of a target object and including a plurality of photosensitive units, wherein a projection of the optical sensor on the display panel along a direction perpendicular to the display panel is within the fingerprint recognition region; and a controller, configured to control photosensitive performance of at least one photosensitive unit corresponding to the edge region to be better than photosensitive performance of at least one photosensitive unit corresponding to the central region.

19 Claims, 17 Drawing Sheets

(51) Int. Cl.
*G06V 40/13* (2022.01)
*G06V 40/12* (2022.01)
*H04N 5/235* (2006.01)
*H04N 5/243* (2006.01)
*H04N 5/232* (2006.01)

(52) U.S. Cl.
CPC ......... *G06V 40/1365* (2022.01); *H04N 5/232* (2013.01); *H04N 5/2353* (2013.01); *H04N 5/243* (2013.01)

(58) Field of Classification Search
USPC .......................................... 345/173, 156, 76
See application file for complete search history.

(56) References Cited

U.S. PATENT DOCUMENTS

| | | | |
|---|---|---|---|
| 2017/0228056 A1 | 8/2017 | North et al. | |
| 2017/0316248 A1 | 11/2017 | He et al. | |
| 2019/0332843 A1* | 10/2019 | Li | G06V 40/1318 |
| 2020/0006448 A1 | 1/2020 | Chen et al. | |
| 2020/0110919 A1* | 4/2020 | Qiu | G06V 40/13 |

FOREIGN PATENT DOCUMENTS

| | | | |
|---|---|---|---|
| CN | 107037885 A | 8/2017 | |
| CN | 107194321 A | 9/2017 | |
| CN | 107292294 A | 10/2017 | |
| CN | 107305411 A | 10/2017 | |
| CN | 207529397 U | 6/2018 | |
| CN | 108323206 | 7/2018 | |
| CN | 108416247 A | 8/2018 | |
| CN | 108416248 A | 8/2018 | |
| CN | 108520241 A | 9/2018 | |
| CN | 108647606 | 10/2018 | |
| CN | 108701231 A | 10/2018 | |
| CN | 108807489 | 11/2018 | |
| CN | 109416740 A | 3/2019 | |
| WO | WO-2020073165 A1 * | 4/2020 | G06F 3/0304 |

OTHER PUBLICATIONS

WIPO, International Search Report for PCT/CN2019/094108, dated Oct. 8, 2019.
SIPO, Notification to Grant Patent Right for Invention for CN Application No. 201910104865.5, dated May 26, 2021.
EPO, Extended European Search Report for EP Application No. 19913440.4, dated Feb. 25, 2022.

* cited by examiner

ELECTRONIC DEVICE

CROSS REFERENCE

The present application is a continuation of International Application No. PCT/CN2019/094108, filed Jun. 30, 2019, which claims priority to Chinese Patent Application No. 201910104865.5, filed Feb. 1, 2019, and priority to Chinese Patent Application No. 201910105493.8, filed Feb. 1, 2019. The entire disclosures of the aforementioned applications are incorporated herein by reference.

TECHNICAL FIELD

The present disclosure relates to the field of electronic technologies, and in particular to an electronic device.

BACKGROUND

With the development of display technologies, display devices with a fingerprint recognition function have been widely used. A user can touch a display screen of the display device with a finger to enable the display device to collect and recognize a fingerprint pattern of the user. In the related art, as for optical fingerprint technologies, a bright spot pattern of the display screen is adopted to fill light. A fingerprint image formed by an optical fingerprint sensor will appear darker at edges and brighter at the center, due to optical characteristics of lens of the optical fingerprint sensor. In this way, the fingerprint pattern at the center will appear overexposed, and the imaging is blurred at the edges, reducing the sensitivity of fingerprint recognition.

SUMMARY OF THE DISCLOSURE

The present disclosure provides an electronic device, including: a display panel, including a fingerprint recognition region, the fingerprint recognition region including a central region and an edge region surrounding the central region; an optical sensor, configured to collect a fingerprint image of a target object and including a plurality of photosensitive units, wherein a projection of the optical sensor on the display panel along a direction perpendicular to the display panel is within the fingerprint recognition region; and a controller, configured to control photosensitive performance of at least one photosensitive unit corresponding to the edge region to be better than photosensitive performance of at least one photosensitive unit corresponding to the central region.

The present disclosure further provides an electronic device, including a display panel, including a fingerprint recognition region, wherein the fingerprint recognition region includes a central region and an edge region surrounding the central region; and an optical sensor, arranged corresponding to the fingerprint recognition region and configured to collect a fingerprint image of a target object; wherein photosensitive performance of a region of the optical sensor corresponding to the edge region is better than photosensitive performance of a region of the optical sensor corresponding to the central region.

The present disclosure further provides an electronic device, including: a display panel, including a fingerprint recognition region, wherein the fingerprint recognition region includes a central region and an edge region surrounding the central region; an optical sensor, configured to collect a fingerprint image of a target object and including a plurality of photosensitive units, wherein a projection of the optical sensor on the display panel along a direction perpendicular to the display panel is within the fingerprint recognition region; the plurality of photosensitive units include at least one photosensitive unit corresponding to the edge region and at least one photosensitive unit corresponding to the central region; a projection of each of the at least one photosensitive unit corresponding to the edge region on the display panel along the direction perpendicular to the display panel is within the edge region; a projection of each of the at least one photosensitive unit corresponding to the central region on the display panel along the direction perpendicular to the display panel is within the central region; and a controller, configured to control photosensitive performance of the at least one photosensitive unit corresponding to the edge region to be better than photosensitive performance of the at least one photosensitive unit corresponding to the central region.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description illustrate only some embodiments of the present disclosure. For those skilled in the art, other drawings can be obtained based on these drawings without creative work.

DETAILED DESCRIPTION

Figure 1:
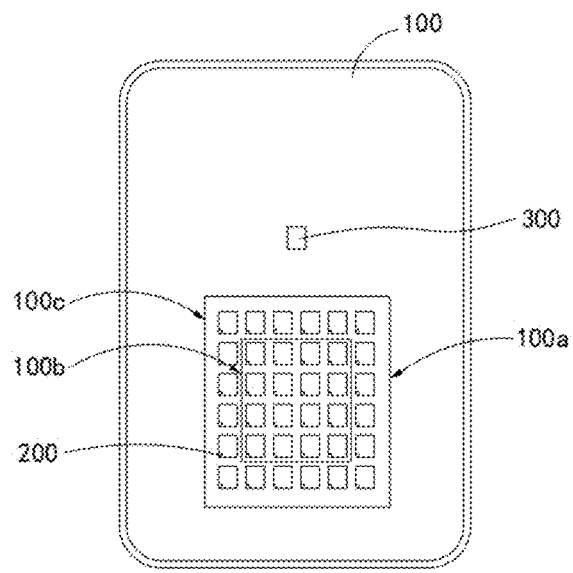
FIG. 1 is a structural schematic view of an electronic device according to an embodiment of the present disclosure.

In a first aspect, the present disclosure provides an electronic device, including: a display panel, including a fingerprint recognition region, the fingerprint recognition region including: a central region and an edge region surrounding the central region; an optical sensor, configured to collect a fingerprint image of a target object and including a plurality of photosensitive units, wherein a projection of the optical sensor on the display panel along a direction perpendicular to the display panel is within the fingerprint recognition region; and a controller, configured to control photosensitive performance of at least one photosensitive unit corresponding to the edge region to be better than photosensitive performance of at least one photosensitive unit corresponding to the central region With reference to the first aspect, in a first embodiment, the photosensitive performance of a corresponding photosensitive unit is at least determined by a gain of the corresponding photosensitive unit, the photosensitive performance being proportional to the gain; the controller is further configured to control the gain of the at least one photosensitive unit corresponding to the edge region to be greater than the gain of the at least one photosensitive unit corresponding to the central region.

With reference to the first embodiment of the first aspect, in a second embodiment, the controller is further configured to control the gain of each of the at least one photosensitive unit corresponding to the central region to gradually increase in a direction from the central region to the edge region, and to control the gain of each of the at least one photosensitive unit corresponding to the edge region to gradually increase in the direction from the central region to the edge region; the gain of each of the at least one photosensitive unit corresponding to the central region is less than the gain of each of the at least one photosensitive unit corresponding to the edge region.

With reference to the first aspect, or the first embodiment of the first aspect, or the second embodiment of the first aspect, in a third embodiment, the photosensitive performance of a corresponding photosensitive unit is at least determined by a gain of the corresponding photosensitive unit, the photosensitive performance being proportional to the gain; the electronic device further includes a filtering unit and an amplifying unit; each of the plurality of photosensitive units is configured to receive a detection signal; the filtering unit is configured to filter out a clutter in the detection signal; the amplifying unit is configured to amplify the amplitude of the detection signal from which the clutter has been filtered out; the gain of the each of the plurality of photosensitive units is proportional to an amplification factor of the amplifying unit.

With reference to the first aspect or the first embodiment of the first aspect, in a fourth embodiment, the photosensitive performance of a corresponding photosensitive unit is further determined by an exposure duration of the corresponding photosensitive unit, the photosensitive performance being proportional to the exposure duration; the controller is further configured to control the exposure duration of each of the at least one photosensitive unit corresponding to the edge region to be greater than the exposure duration of each of the at least one photosensitive unit corresponding to the central region.

With reference to the fourth embodiment of the first aspect, in a fifth embodiment, the controller is further configured to adjust the exposure duration and the gain of the each of the at least one photosensitive unit corresponding to the edge region to obtain a first parameter, and configured to adjust the exposure duration and the gain of the each of the at least one photosensitive unit corresponding to the central region to obtain a second parameter; a first image is obtained under the first parameter by the each of the at least one photosensitive unit corresponding to the edge region, and when a second image is obtained under the second parameter by the each of the at least one photosensitive unit corresponding to the edge region, the sharpness of the first image is greater than the sharpness of the second image.

With reference to the first aspect, in a sixth embodiment, the controller is further configured to adjust the brightness of the display panel corresponding to the plurality of photosensitive units to a target brightness, and record an adjustment time for adjusting the brightness of the display panel to the target brightness; in response to the plurality of photosensitive units being required to be turned on next time, the controller is further configured to adjust the brightness of the display panel based on the adjustment time.

With reference to the first aspect, in a seventh embodiment, the photosensitive performance of corresponding photosensitive units is at least determined by an arrangement density of the corresponding photosensitive units and is proportional to the arrangement density; the controller is further configured to control the arrangement density of the at least one photosensitive unit corresponding to the edge region to be greater than the arrangement density of the at least one photosensitive unit corresponding to the central region.

With reference to the first aspect, in an eighth embodiment, the photosensitive performance of a corresponding photosensitive unit is at least determined by a sensitivity of the corresponding photosensitive unit, the photosensitive performance being proportional to the sensitivity; the controller is further configured to control the sensitivity of each of the at least one photosensitive unit corresponding to the edge region to be greater than the sensitivity of each of the at least one photosensitive unit corresponding to the central region.

With reference to the first aspect, in an ninth embodiment, the controller is further configured to control the brightness of a light spot pattern displayed in the fingerprint recognition region when the display panel performs fingerprint recognition, such that the brightness of an edge region of the light spot pattern is greater than the brightness of a central region of the light spot pattern; wherein the controller is configured to control the brightness of the edge region of the light spot pattern to gradually decrease in a direction approaching the central region of the light spot pattern, and control the brightness of the central region of the light spot pattern to be constant.

With reference to the first aspect, in an tenth embodiment, the electronic device further includes a detector; when the detector detects that a target photosensitive unit of the plurality of photosensitive units has been damaged, the detector is configured to send a feedback signal, and the controller is configured to control an exposure duration of a first photosensitive unit of the plurality of photosensitive units adjacent to the target photosensitive unit to be greater than a first preset duration based on the feedback signal; the first preset duration is an exposure duration of the first photosensitive unit when the target photosensitive unit is not yet damaged.

With reference to the tenth embodiment of the first aspect, in an eleventh embodiment, the plurality of photosensitive units further include a second photosensitive unit arranged adjacent to the target photosensitive unit; the first photosensitive unit is arranged closer to a center of the optical sensor relative to the second photosensitive unit; the controller is further configured to control an exposure duration of the second photosensitive unit to be greater than a second preset duration, wherein the first preset duration is less than the second preset duration, and the second preset duration is an exposure duration of the second photosensitive unit when the target photosensitive unit is not yet damaged.

With reference to the first aspect, in a twelfth embodiment, the plurality of photosensitive units further include a target photosensitive unit, a first photosensitive unit and a second photosensitive unit, the first photosensitive unit and the second photosensitive unit being both arranged adjacent to the target photosensitive unit; in condition of the target photosensitive unit being damaged, the controller is further configured to perform fitting on a fingerprint pattern of the target object obtained by the first photosensitive unit and another fingerprint pattern of the target object obtained by the second photosensitive unit to obtain a fingerprint pattern corresponding to the target photosensitive unit.

With reference to the first aspect, in a thirteenth embodiment, the display panel further includes an anode layer, a light-emitting layer, and a cathode layer stacked in sequence; a driving voltage is applied between the anode layer and the cathode layer to cause the light-emitting layer to emit light; the light-emitting layer includes a part corresponding to the edge region and a part corresponding to the central region; a projection of the part of the light-emitting layer corresponding to the edge region on the display panel along the direction perpendicular to the display panel is within the edge region; a projection of the part of the light-emitting layer corresponding to the central region on the display panel along the direction perpendicular to the display panel is within the central region; the controller is further configured to control the part of the light-emitting layer corresponding to the central region to be loaded with a first voltage, and control the part of the light-emitting layer corresponding to the edge region to be loaded with a second voltage; the voltage value of the first voltage is less than the voltage value of the second voltage; the light-emitting layer is arranged with a red sub-pixel, a green sub-pixel and a blue sub-pixel at a part facing the central region, and is arranged with a red sub-pixel, a green sub-pixel, a blue sub-pixel and a white sub-pixel at a part facing the edge region; when the optical sensor collects the fingerprint image of the target object, the controller controls the red sub-pixel of the central region and the red sub-pixel of the edge region not to emit light.

With reference to the first aspect, in a fourteenth embodiment, the optical sensor further includes a plurality of lenses; each of the plurality of lenses is configured to focus light incident from the display panel to a corresponding photosensitive unit and then transmit the light to the corresponding photosensitive unit; a central region of the each of the plurality of lenses has a greater focus on light than an edge region of the each of the plurality of lenses does; a focus curve of the each of the plurality of lenses is complementary to a photosensitive performance curve of the corresponding photosensitive unit.

With reference to the first embodiment of the first aspect, in a fifteenth embodiment, the number of the at least one photosensitive unit corresponding to the edge region is more than one, and the number of the at least one photosensitive unit corresponding to the central region is more than one; the gains of the at least one photosensitive unit corresponding to the edge region are same; the gains of the at least one photosensitive unit corresponding to the central region are same.

With reference to the first embodiment of the first aspect, in a sixteen embodiment, the fingerprint recognition region further comprises a boundary region arranged between the central region and the edge region; the plurality of photosensitive units further comprise at least one photosensitive unit corresponding to the boundary region; the controller is further configured to control a comprehensive value of the gain of the at least one photosensitive unit corresponding to the boundary region to be an average value of the comprehensive value of the gain of the at least one photosensitive unit corresponding to the edge region and the comprehensive value of the gain of the at least one photosensitive unit corresponding to the central region.

With reference to the tenth embodiment of the first aspect, in a seventeenth embodiment, in condition of the first photosensitive unit being arranged closer to the central region relative to the target photosensitive unit, the controller is further configured to control the exposure duration of the first photosensitive unit with a first increment based on the first preset duration; in condition of the first photosensitive unit being arranged closer to the edge region relative to the target photosensitive unit, the controller is further configured to control the exposure duration of the first photosensitive unit with a second increment based on the first preset duration; the first increment is less than the second increment.

In a second aspect, the present disclosure provides an electronic device, including a display panel, including a fingerprint recognition region, wherein the fingerprint recognition region includes a central region and an edge region surrounding the central region; and an optical sensor, arranged corresponding to the fingerprint recognition region and configured to collect a fingerprint image of a target object; wherein photosensitive performance of a region of the optical sensor corresponding to the edge region is better than photosensitive performance of a region of the optical sensor corresponding to the central region.

In a third aspect, the present disclosure provides an electronic device, including: a display panel, including a fingerprint recognition region, wherein the fingerprint recognition region includes a central region and an edge region surrounding the central region; an optical sensor, configured to collect a fingerprint image of a target object and including a plurality of photosensitive units, wherein a projection of the optical sensor on the display panel along a direction perpendicular to the display panel is within the fingerprint recognition region; the plurality of photosensitive units include at least one photosensitive unit corresponding to the edge region and at least one photosensitive unit corresponding to the central region; a projection of each of the at least one photosensitive unit corresponding to the edge region on the display panel along the direction perpendicular to the display panel is within the edge region; a projection of each of the at least one photosensitive unit corresponding to the central region on the display panel along the direction perpendicular to the display panel is within the central region; and a controller, configured to control photosensitive performance of the at least one photosensitive unit corresponding to the edge region to be better than photosensitive performance of the at least one photosensitive unit corresponding to the central region.

The technical solutions in the embodiments of the present disclosure will be clearly and completely described below in conjunction with the drawings in the embodiments of the present disclosure. Obviously, the described embodiments are only a part of the embodiments of the present disclosure, rather than all of them. Based on the implementation in the present disclosure, all other implementation obtained by those skilled in the art without creative work fall within the scope of the present disclosure.

Figure 2:
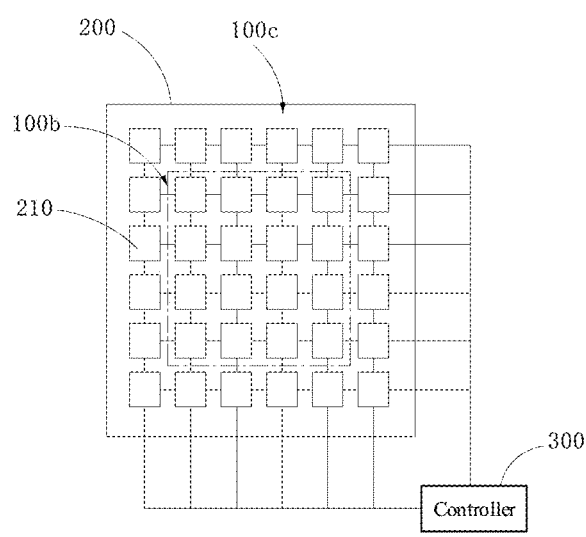
FIG. 2 is a schematic view of a connection between an optical sensor and a controller according to an embodiment of the present disclosure.

The present disclosure provides an electronic device 1 with a fingerprint identification function. The electronic device 1 refers to a device including electronic components such as an integrated circuit, a transistor, an electron tube, etc. and operating based on electronic technologies including software. Conventionally, the electronic device 1 may be: smart phones, tablet computers, notebook computers, handheld computers, mobile internet devices (MID), wearable devices, such as smart watches, smart bracelets, pedometers, etc. Referring to FIGS. 1 and 2, the electronic device 1 includes a display panel 100, an optical sensor 200 and a controller 300. The display panel 100 includes a fingerprint recognition region 100a. The fingerprint recognition region 100a includes a central region 100b and an edge region 100c surrounding the central region 100b. The optical sensor 200 is arranged corresponding to the fingerprint recognition region 100a. That is, a projection of the optical sensor 200 on the display panel 100 along a direction perpendicular to the display panel 100 may be within the fingerprint recognition region 100a. The optical sensor 200 is configured to collect a fingerprint image of a target object and has a plurality of photosensitive units 210. The controller 300 is configured to control a performance parameter of the photosensitive unit 210 corresponding to the edge region 100c to be better than a performance parameter of the photosensitive unit 210 corresponding to the central region 100b. It can be understood that the photosensitive unit 210 corresponding to the edge region 100c may refer to a photosensitive unit 210, of which a projection on the display panel 100 along the direction perpendicular to the display panel 100 is within the edge region 100c. Similarly, the photosensitive unit 210 corresponding to the central region 100b may refer to a photosensitive unit 210, of which a projection on the display panel 100 along the direction perpendicular to the display panel 100 is within the central region 100b. The display panel 100 may be a liquid crystal display panel 100 or an organic light emitting diode display panel 100.

Figure 3:
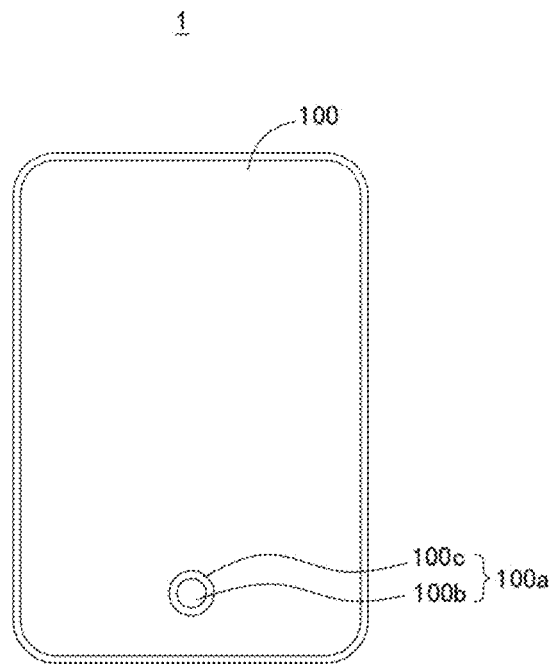
FIG. 3 is a structural schematic view of an electronic device according to another embodiment of the present disclosure.

The shape of the fingerprint recognition region 100a may be circular, rectangular, etc. In some embodiments, the central region 100b may be completely surrounded by the edge region 100c. In other embodiments, the central region 100b may also be partially surrounded by the edge region 100c. As shown in FIG. 1, the fingerprint recognition region 100a is a rectangle as an example for illustration. In other embodiments, the fingerprint recognition region 100a may be circular. Referring to FIG. 3, the central region 100b is completely surrounded by the edge region 100c. The central region 100b is circular, and the edge region 100c is also ring-shaped.

The optical sensor 200 generally refers to a device that can sense light energy from ultraviolet light to infrared light and convert the light energy into an electrical signal. The optical sensor 200 may be designed to be adjustable in block shape, circle shape, dot shape, or other adjustment forms, such that the optical sensor 200 can be adaptively adjusted according to the shape of filling light by an actual spot pattern. In this way, the optical sensor 200 can be adapted to more complex application environments.

The light signal generated from the light energy and recognized by the optical sensor 200 may be visible light or invisible light.

For example, the light signal is visible light, and a photoelectric effect occurs when a photosensitive layer of the optical sensor 200 senses the visible light. For example, the material of the photosensitive layer of the optical sensor 200 may be a silicon-rich compound, including but not limited to silicon-rich silicon oxide ($SiO_x$), silicon-rich silicon nitride ($SiN_y$), silicon-rich silicon oxynitride ($SiO_xN_y$), etc., where x, y is a positive integer, such as x=2, y=2. The material of an input end of the optical sensor 200 may be transparent and conductive. The transparent conductive material may be, but is not limited to, indium tin oxide (ITO). The light signal passes through the input end of the optical sensor 200 and enters the photosensitive layer of the optical sensor 200.

The controller 300 may be a central processing unit or a microprocessor.

The photosensitive units 210 may be of a photodiode. The photodiode is a semiconductor device including a PN junction and has unidirectional conductivity. The photosensitive units 210 are of a photoelectric sensor device that converts the light signal into the electrical signal in the circuit.

The target object may touch the fingerprint recognition region 100a to achieve the function of collecting and matching the fingerprint image of the target object. The target object may be a user. The optical sensor 200 is arranged corresponding to the fingerprint recognition region 100a. Further, the optical sensor 200 may be arranged directly facing the central region 100b of the fingerprint recognition region 100a, such that the optical sensor 200 can collect relatively complete fingerprint images, improving the sensitivity of fingerprint recognition.

In can be understood that the number of the photosensitive units 210 corresponding to the edge region 100c may be one or more than one, and the number of the photosensitive unit 210 corresponding to the central region 100b may be one or more than one. In the embodiments, the performance parameter of the photosensitive unit 210 corresponding to the edge region 100c is better than the performance parameter of the photosensitive unit 210 corresponding to the central region 100b, which may mean that a comprehensive performance parameter of the photosensitive units 210 corresponding to the edge region 100c is better than that of the photosensitive units 210 corresponding to the central region 100b. The performance parameters of some of the photosensitive units 210 corresponding to the edge region 100c may be worse than those of some of the photosensitive units 210 corresponding to the central region 100b, but the comprehensive performance parameter of the photosensitive units 210 corresponding to the edge region 100c is better than that of the photosensitive units 210 corresponding to the central region 100b. The performance parameter may be represented by a gain of the photosensitive unit 210, an exposure duration of the photosensitive unit 210, an arrangement density of the photosensitive units 210, and a sensitivity of the photosensitive unit 210. In the related art, the performance parameter of the photosensitive unit 210 corresponding to the edge region 100c is equal to the performance parameter of the photosensitive unit 210 corresponding to the central region 100b. Then, when the optical sensor 200 performs the fingerprint recognition, due to characteristics of lens (collimator) in the optical fingerprint sensor 200, a part of the fingerprint image obtained by the optical sensor 200 corresponding to the edge region 100c is darker, and a part corresponding to the central region 100b is brighter. In this way, the sharpness of the part of the fingerprint image corresponding to the edge region 100b is not high, resulting in a poor sensitivity of fingerprint recognition. In the embodiments, the performance parameter of the photosensitive unit 210 corresponding to the edge region 100c is better than that of the photosensitive unit 210 corresponding to the central region 100b, such that the difference in sharpness between the part of the fingerprint image obtained by the optical sensor 200 corresponding to the edge region 100c and the part corresponding to the central region 100b is less than a preset difference. The preset difference may be equal to the difference in sharpness between the part corresponding to the edge region 100c and the part corresponding to the central region 100b of the fingerprint image, when the performance parameter of the photosensitive unit 210 corresponding to the edge region 100c is equal to that of the photosensitive unit 210 corresponding to the central region 100b.

When the performance parameter of the photosensitive unit 210 corresponding to the central region 100b is equal to a preset performance parameter, and when the controller 300 controls the performance parameter of the photosensitive unit 210 corresponding to the edge region 100c to be better than that of the photosensitive unit 210 corresponding to the central region 100b, an obtained image is referred to as a first fingerprint image. Under the premise that the performance parameter of the photosensitive unit 210 corresponding to the central region 100b is constant, that is, the performance parameter of the photosensitive unit 210 corresponding to the central region 100b is also equal to the preset performance parameter, when the controller 300 controls the performance parameter of the photosensitive unit 210 corresponding to the edge region 100c to be equal to that of the photosensitive unit 210 corresponding to the central region 100b, an obtained image is referred to as a second fingerprint image. The sharpness of the first fingerprint image is better than that of the second fingerprint image. It should be understood that the terms "first" and "second" are only for descriptive purposes, and cannot be understood as indicating or implying relative importance or implicitly indicating the number of indicated technical features. Therefore, the features defined with "first" and "second" may explicitly or implicitly include one or more of the features. In the related art, as for optical fingerprint technologies, a bright spot pattern of the display screen is adopted to fill light. The fingerprint image formed by the optical sensor 200 will appear darker at edges and brighter at the center, due to optical characteristics of lens of the optical fingerprint sensor 200. In this way, the fingerprint pattern at the center of the fingerprint recognition region 110a will appear overexposed, and the imaging is blurred at the edges of the fingerprint recognition region 110a, reducing the sensitivity of fingerprint recognition. In the embodiments of the present disclosure, the electronic device 1 includes a display panel 100, an optical sensor 200 and a controller 300. The optical sensor 200 is arranged corresponding to a fingerprint recognition region 100a. The optical sensor 200 is configured to collect a fingerprint image of a target object. The fingerprint recognition region 100a includes a central region 100b and an edge region 100c surrounding the central region 100b. The controller 300 is configured to control a performance parameter of the photosensitive unit 210 corresponding to the edge region 100c to be better than a performance parameter of the photosensitive unit 210 corresponding to the central region 100b, which complements the optical properties of the optical sensor 200 with the lens appearing bright at the center and dark at the edges, thereby improving the overall sharpness of the collected fingerprint image and thus the sensitivity of fingerprint recognition.

Figure 4:
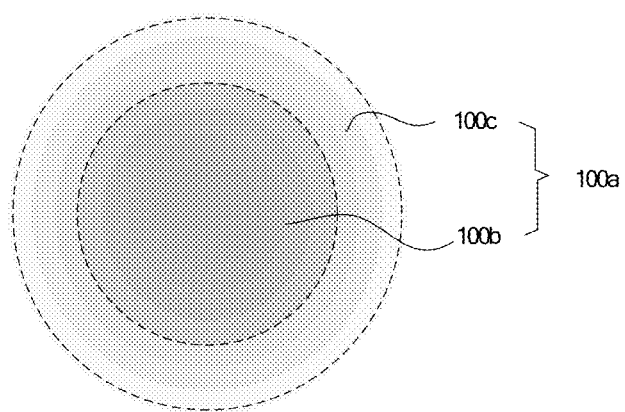
FIG. 4 is a schematic view of a display effect of a fingerprint recognition region according to an embodiment of the electronic device shown in FIG. 3.

Specifically, referring to FIGS. 3 and 4, when the central region 100b is completely surrounded by the edge region 100c, and when the central region 100b is circular and the edge region 100c is ring-shaped, a light spot pattern with gradual brightness is formed in the fingerprint recognition region 100a. The brightness of an edge region of the light spot pattern is greater than the brightness of a central region of the light spot pattern. As shown in FIG. 4 as an example, the brightness of the light spot pattern gradually decreases from the edge region 100c to the central region 100b.

Figure 5:
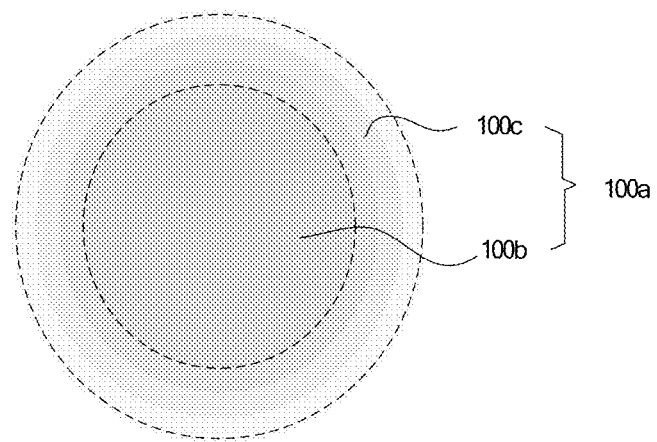
FIG. 5 is a schematic view of a display effect of a fingerprint recognition region according to another embodiment of the electronic device shown in FIG. 3.

Referring to FIG. 3 and FIG. 5, the brightness of the light spot pattern changes in the edge region 100c, while the brightness in the central region 100b is unchanged. Specifically, in the edge region 100c, the brightness gradually decreases in a direction approaching the central region 100b, and the brightness of the edge region 100c is greater than the brightness of the central region 100b.

In some embodiments, photosensitive performance is at least determined by the gain of the photosensitive unit 210. The photosensitive performance is proportional to the gain. The controller 300 is further configured to control the gain of the photosensitive unit corresponding to the edge region 100c to be greater than the gain of the photosensitive unit 210 corresponding to the central region 100b. It can be understood that the photosensitive performance may be characterized by the performance parameter.

The "gain" refers to an amplification factor. When specifically designing the gain parameter of each photosensitive unit 210 of the optical sensor 200, a fingerprint-free planar image is obtained and calibrated, and a brightness parameter of each photosensitive unit 210 corresponding to the image is obtained. Then the gains of the photosensitive units 210 at different positions are controlled through the controller 300, and the gain parameters of all the photosensitive units 210 are controlled to be consistent through the same. In this way, all the photosensitive units 210 are in an initialization state. Subsequently, the fingerprint-free planar image is obtained again, the image and the gain parameter of each photosensitive unit 210 are recorded, and the image and the gain parameter of each photosensitive unit 210 are configured as calibration parameters of subsequently collected fingerprint images. Through the corresponding brightness parameter of each photosensitive unit 210 when collecting the fingerprint-free image, the gain parameters of all photosensitive units 210 are adjusted to be consistent, such that all photosensitive units 210 are in the initialized state, which is configured as a reference for adjustment to facilitate subsequent adjustments of the gain parameters of the photosensitive units 210. In this way, the gain parameters of the photosensitive units 210 in different positions may be ensured to satisfy needs of users, the sharpness of the collected fingerprint image in the edge region 100c may be improved, and thus the sensitivity of fingerprint recognition may be improved.

Specifically, in the embodiments, in cases that the number of the number of the photosensitive units 210 corresponding to the edge region 100c is more than one, and the number of the photosensitive unit 210 corresponding to the central region 100b is more than one, the gains of all the photosensitive units 210 corresponding to the edge region 100c are remained the same, the gains of all the photosensitive units 210 corresponding to the central region 100b are remained the same, and the gains of the photosensitive units 210 corresponding to the edge region 100c are greater than the gains of the photosensitive units 210 corresponding to the central region 100b. The gains of all the photosensitive units 210 corresponding to the edge region 100c and the gains of all the photosensitive units 210 corresponding to the central region 100b show a two-stage step change. On one hand, the gains of the photosensitive units 210 may be conveniently adjusted, and on the other hand, the brightness of the edge region 100c may be improved. In this way, fingerprint images corresponding to the edge region 100c may be clearer, improving the sensitivity of fingerprint recognition. For example, the gain of each photosensitive unit 210 corresponding to the edge region 100c is 3, and the gain of each photosensitive unit 210 corresponding to the central region 100b is 2.

Figure 6:
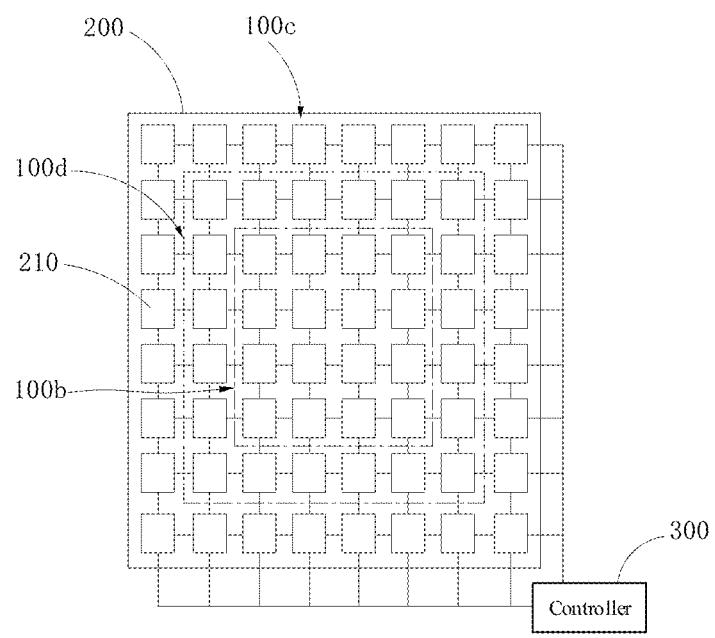
FIG. 6 is a schematic view of a connection between an optical sensor and a controller according to another embodiment of the present disclosure.

Further referring to FIG. 6, a boundary region 100d exists at a position between the central region 100b and the edge region 100c. The gain of the photosensitive unit 210 corresponding to the boundary region 100d is an average value of the gain of the photosensitive unit 210 corresponding to the central region 100b and the gain of the photosensitive unit 210 corresponding to the edge region 100c. It can be understood that, the photosensitive unit 210 corresponding to the boundary region 100d may refer to photosensitive units 210, of which a projection on the display panel 100 along the direction perpendicular to the display panel 100 is within the boundary region 100d. The gain of all the photosensitive unit 210 corresponding to the edge region 100c, the gain of all the photosensitive unit 210 corresponding to the boundary region 100d, and the gain of all the photosensitive unit 210 corresponding to the central region 100b show a three-stage step change. On one hand, the gains of the photosensitive units 210 may be conveniently adjusted, and on the other hand, the brightness of the edge region 100c may be improved. In this way, the fingerprint image corresponding to the edge region 100c may be clearer, improving the sensitivity of fingerprint recognition. For example, the gain of each photosensitive unit 210 corresponding to the edge region 100c is 3, the gain of each photosensitive unit 210 corresponding to the central region 100b is 2, and the gain of each photosensitive unit 210 corresponding to the boundary region 100d is 2.5.

Figure 7:
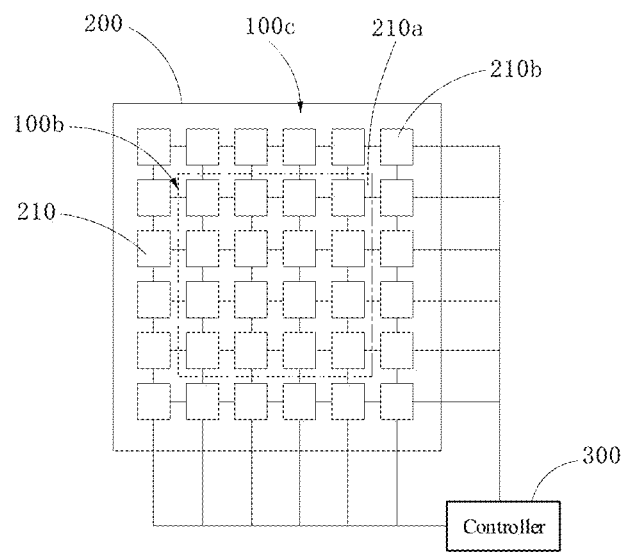
FIG. 7 is a schematic view of a connection between an optical sensor and a controller according to further another embodiment of the present disclosure.

Referring to FIG. 7, in other embodiments, the plurality of photosensitive units 210 may be divided into a first photosensitive unit group 210a and a second photosensitive unit group 210b. The first photosensitive unit group 210a is arranged corresponding to the central region 100b, and the second photosensitive unit group 210b is arranged corresponding to the edge region 100c. The controller 300 is configured to control the gain of the photosensitive unit 210 in the first photosensitive unit group 210a to gradually increase in a direction from the central region 100b to the edge region 100c, and to control the gain of the photosensitive unit 210 in the second photosensitive unit group 210b to gradually increase in the direction from the central region 100b to the edge region 100c. The gain of the photosensitive unit 210 in the first photosensitive unit group 210a is less than the gain of the photosensitive unit 210 in the second photosensitive unit group 210b. In the description of the embodiments of the present disclosure, "plurality" means two or more, unless otherwise clearly defined.

The gain of the photosensitive unit 210 in the first photosensitive unit group 210a gradually increasing from the central region 100b to the edge region 100c, and the gain of the photosensitive unit 210 in the second photosensitive unit group 210b gradually increasing from the central region 100b to the edge region 100c may refer to a linear or non-linear increasing.

Specifically, from an overall point of view, the gains of the photosensitive units 210 corresponding to the fingerprint recognition region 100a gradually increase from the central region 100b to the edge region 100c, and the gains of the photosensitive units 210 change continuously from the central region 100b to the edge region 100c, which helps to keep the brightness of the fingerprint recognition region 100a uniform, thereby improving the sharpness of the collected fingerprint image and improving the sensitivity of fingerprint identification. From a local point of view, the gain of the photosensitive unit 210 in the first photosensitive unit group 210a corresponding to the central region 100b gradually increases in a direction from the central region 100b to the edge region 100c, and the gain of the photosensitive unit 210 in the second photosensitive unit group 210b corresponding to the edge region 100c gradually increases in the direction from the central region 100b to the edge region 100c. The gain of the photosensitive unit 210 in the first photosensitive unit group 210a is less than the gain of the photosensitive unit 210 in the second photosensitive unit group 210b. Therefore, it is ensured that the photosensitive performance of the photosensitive unit 210 corresponding to the edge region 100c after processing is better than that of the photosensitive unit 210 corresponding to the central region 100b, which complements the optical properties of the optical sensor 200 with the lens appearing bright at the center and dark at the edges, thereby improving the overall sharpness of the collected fingerprint image and thus the sensitivity of fingerprint recognition.

Further, the gains of the photosensitive units 210 corresponding to a part of the edge region 100c that is at the same distance from the central region 100b remain the same. That is, when drawing a circle with a center point of the central region 100b as a center of the circle, the gains of the photosensitive units 210 corresponding to different positions on the same circle are remained consistent, which keeps the performance of the photosensitive units 210 in the entire fingerprint recognition region 100a uniform, thereby improving the overall sharpness of the collected fingerprint image and thus the sensitivity of fingerprint recognition.

It should be noted that while adjusting the gains of the photosensitive units 210, the exposure durations of the photosensitive units 210 may also be adjusted at the same time. The adjustment of the exposure durations of the photosensitive units 210 will be described in detail below and will not be explained herein.

Figure 8:
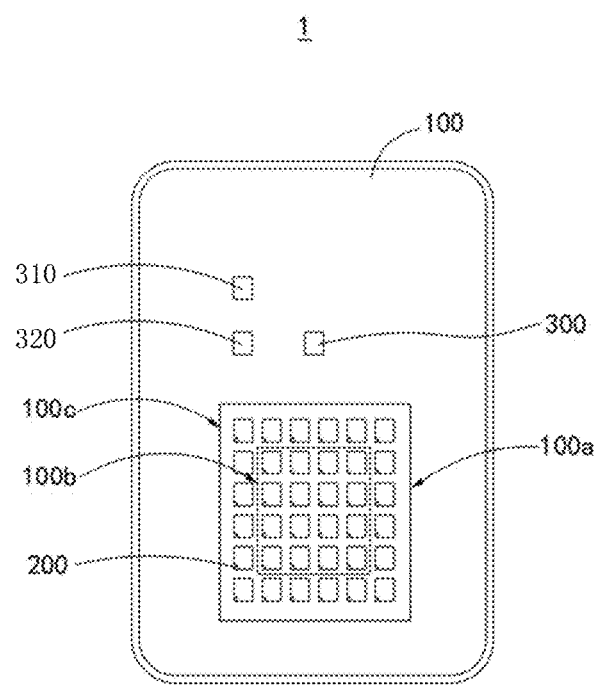
FIG. 8 is a structural schematic view of an electronic device according to further another embodiment of the present disclosure.

Referring to FIG. 8, in other embodiments, the photosensitive performance is at least determined by the gain of the photosensitive unit 210, and the photosensitive performance is proportional to the gain. The electronic device 1 further includes a filtering unit 310 and an amplifying unit 320. The photosensitive unit 210 is configured to receive a detection signal, and the filtering unit 310 is configured to filter out a clutter in the detection signal. The amplifying unit 320 is configured to amplify the amplitude of the detection signal from which the clutter has been filtered out. The gain of the photosensitive unit 210 is proportional to an amplification factor of the amplifying unit 320. That is, the amplifying unit 320 is configured to adjust the gain of the photosensitive unit 210. The amplifying unit 320 may be an amplifier.

Specifically, when the gain of the photosensitive unit 210 is simply changed, the noise of the detection signal will increase at the same time. Therefore, it is necessary to remove the noise from the detection signal emitted by the photosensitive unit 210 while increasing the gain of the photosensitive unit 210 of the optical sensor 200, thereby preventing noise from adversely interfering with the sharpness of the collected fingerprint image, and improving the accuracy of fingerprint recognition.

In other embodiments, the photosensitive performance is further determined by the exposure duration of the photosensitive unit 210, and the photosensitive performance is proportional to the exposure duration. The controller 300 is further configured to control the exposure duration of the photosensitive unit 210 corresponding edge region 100c to be greater than the exposure duration of the photosensitive unit 210 corresponding to the central region 100b.

The photosensitive unit 210 may be a photodiode, and the controller 300 may be configured to adjust the exposure duration of the photosensitive unit 210 by controlling a turn-on duration of the photodiode.

In some embodiments, the exposure durations of all the photosensitive units 210 corresponding to the edge region 100c are remained the same, the exposure durations of all the photosensitive units 210 corresponding to the central region 100b are remained the same, and the exposure durations of the photosensitive units 210 corresponding to the edge region 100c are greater than the exposure durations of the photosensitive units 210 corresponding to the central region 100b. The exposure durations of all the photosensitive units 210 corresponding to the edge region 100c and the exposure durations of all the photosensitive units 210 corresponding to the central region 100b show a two-stage step change. On one hand, the exposure durations of the photosensitive units 210 may be conveniently adjusted, and on the other hand, the brightness of the edge region 100c may be improved. In this way, fingerprint images corresponding to the edge region 100c may be clearer, improving the sensitivity of fingerprint recognition. For example, the exposure duration of each photosensitive unit 210 corresponding to the edge region 100c is 0.08 s, and the exposure duration of each photosensitive unit 210 corresponding to the central region 100b is 0.04 s.

Further, a boundary region 100d exists at a position between the central region 100b and the edge region 100c. The exposure duration of the photosensitive unit 210 corresponding to the boundary region 100d is an average value of the exposure duration of the photosensitive unit 210 corresponding to the central region 100b and the exposure duration of the photosensitive unit 210 corresponding to the edge region 100c. The exposure duration of the photosensitive unit 210 corresponding to the edge region 100c, the exposure duration of the photosensitive unit 210 corresponding to the boundary region 100d, and the exposure duration of the photosensitive unit 210 corresponding to the central region 100b show a three-stage step change. On one hand, the exposure durations of the photosensitive units 210 may be conveniently adjusted, and on the other hand, the brightness of the edge region 100c may be improved. In this way, fingerprint images corresponding to the edge region 100c may be clearer, improving the sensitivity of fingerprint recognition. For example, the exposure duration of each photosensitive unit 210 corresponding to the edge region 100c is 0.08 s, the exposure duration of each photosensitive units 210 corresponding to the central region 100b is 0.04 s, and the exposure duration of each photosensitive units 210 corresponding to the boundary region 100d is 0.06 s.

In other embodiments, the plurality of the photosensitive units 210 may be divided into a first photosensitive unit group 210a and a second photosensitive unit group 210b. The first photosensitive unit group 210a is arranged corresponding to the central region 100b, and the second photosensitive unit group 210b is arranged corresponding to the edge region 100c. The controller 300 is configured to control the exposure duration of the photosensitive unit 210 in the first photosensitive unit group 210a to gradually increase in a direction from the central region 100b to the edge region 100c and control the exposure duration of the photosensitive unit 210 in the second photosensitive unit group 210b to gradually increase in the direction from the central region 100b to the edge region 100c. The exposure durations of the photosensitive units 210 in the first photosensitive unit group 210a are less than the exposure durations of the photosensitive units 210 in the second photosensitive unit group 210b.

The exposure duration of the photosensitive unit 210 in the first photosensitive unit group 210a gradually increasing from the central region 100b to the edge region 100c, and the exposure duration of the photosensitive unit 210 in the second photosensitive unit group 210b gradually increasing from the central region 100b to the edge region 100c may refer to a linear or non-linear increasing.

Specifically, from an overall point of view, the exposure durations of the photosensitive units 210 corresponding to the fingerprint recognition region 100a gradually increase from the central region 100b to the edge region 100c, and the exposure durations of the photosensitive units 210 change continuously from the central region 100b to the edge region 100c, thereby improving the sharpness of the collected fingerprint image and improving the sensitivity of fingerprint identification. From a local point of view, the exposure duration of the photosensitive unit 210 in the first photosensitive unit group 210a corresponding to the central region 100b gradually increases in a direction from the central region 100b to the edge region 100c, and the exposure duration of the photosensitive unit 210 in the second photosensitive unit group 210b corresponding to the edge region 100c gradually increases in the direction from the central region 100b to the edge region 100c. The exposure duration of the photosensitive unit 210 in the first photosensitive unit group 210a is less than the exposure duration of the photosensitive unit 210 in the second photosensitive unit group 210b. Therefore, it is ensured that the performance parameter of the photosensitive unit 210 corresponding to the edge region 100c after processing is better than that of the photosensitive unit 210 corresponding to the central region 100b, which complements the optical properties of the optical sensor 200 with the lens appearing bright at the center and dark at the edges, thereby improving the overall sharpness of the collected fingerprint image and thus the sensitivity of fingerprint recognition.

Further, the exposure durations of the photosensitive units 210 corresponding to a part of the edge region 100c that is at the same distance from the central region 100b remain the same. That is, when drawing a circle with a center point of the central region 100b as a center of the circle, the exposure durations of the photosensitive units 210 corresponding to different positions on the same circle are remained consistent, which keeps the performance of the photosensitive units 210 in the entire fingerprint recognition region 100a uniform, thereby improving the overall sharpness of the collected fingerprint image and thus the sensitivity of fingerprint recognition.

In other embodiments, the controller 300 may be configured to adjust the brightness of the display panel 100 corresponding to the photosensitive units 210 to a target brightness, and record an adjustment time for adjusting the brightness of the display panel 100 to the target brightness. When the photosensitive units 210 are required to be turned on next time, the controller 300 is configured to adjust the brightness of the display panel 100 according to the adjustment time.

Specifically, the controller 300 may be configured to adjust the brightness of the photosensitive units 210 corresponding to a fingerprint-free planar image to the target brightness, and record the adjustment time for adjusting the brightness of the photosensitive units 210 to the target brightness, and configure the adjustment time as a reference. When the photosensitive units 210 are required to be turned on next time, the controller 300 may be configured to adjust the exposure durations of the photosensitive units 210 based on the recorded adjustment time, such that the brightness of the photosensitive units 210 may be quickly adjusted to cause the brightness of the photosensitive units 210 to reach the target brightness, preventing a re-adjustment to the brightness of the photosensitive units 210. In this way, time for adjusting the brightness of the photosensitive units 210 may be saved, improving a response speed of the optical sensor 200.

It should be noted that the controller 300 may also be configured to adjust the brightness of the photosensitive unit 210 corresponding to a planar image when a fingerprint is applied to the fingerprint recognition region 100a for fingerprint matching to the target brightness, record the adjustment time for adjusting the brightness of the photosensitive units 210 to the target brightness, and configure the adjustment time as a reference. When the optical sensor 200 is required to be turned on next time for fingerprint image collection and matching, the controller 300 may be configured to adjust the exposure duration of the photosensitive unit 210 based on the recorded adjustment time, such that the brightness of the photosensitive unit 210 may be quickly adjusted to cause the brightness of the photosensitive unit 210 to reach the target brightness, preventing a re-adjustment to the brightness of the photosensitive units 210. In this way, time for adjusting the brightness of the photosensitive units 210 may be saved, and time for collecting and matching the fingerprint image may be shortened, thereby improving a response speed of the optical sensor 200.

In other embodiments, the controller 300 may be configured to adjust the exposure duration and the gain of the photosensitive unit 210 corresponding to the edge region 100c to obtain a first parameter, and may be configured to adjust the exposure duration and the gain of the photosensitive unit 210 corresponding to the central region 100b to obtain a second parameter. A first image is obtained under the first parameter by the photosensitive unit 210 corresponding to the edge region 100c, and when a second image is obtained under the second parameter by the photosensitive unit 210 corresponding to the edge region 100c, the sharpness of the first image is greater than the sharpness of the second image.

The performance parameter of the photosensitive unit 210 corresponding to the edge region 100c is the first parameter, and the performance parameter of the photosensitive unit 210 corresponding to the central region 100b is the second parameter. The photosensitive unit 210 corresponding to the edge region 100c obtains the first image under the first parameter, and when the photosensitive unit 210 corresponding to the edge region 100c obtains the second image under the second parameter, the sharpness of the first image is greater than the sharpness of the second image, which means: a comprehensive parameter of the first parameters of the photosensitive units 210 corresponding to the edge region 100c is better than a comprehensive parameter of the second parameters of the photosensitive units 210 corresponding to the central region 100b. The performance parameters of some of the photosensitive units 210 corresponding to the edge region 100c may be worse than those of some of the photosensitive units 210 corresponding to the central region 100b, but the comprehensive parameter of the photosensitive units 210 corresponding to the edge region 100c is better than the comprehensive parameter of the photosensitive units 210 corresponding to the central region 100b. That is, under a same condition, the sharpness of the first image obtained by the photosensitive unit 210 corresponding to the edge region 100c under the first parameter is greater than the sharpness of the second image obtained by the photosensitive unit 210 corresponding to the edge region 100c under the second parameter. The performance parameters may be represented by the gain of the photosensitive unit 210, the exposure duration of the photosensitive unit 210, the arrangement density of the photosensitive units 210, and the sensitivity of the photosensitive unit 210.

Figure 9:
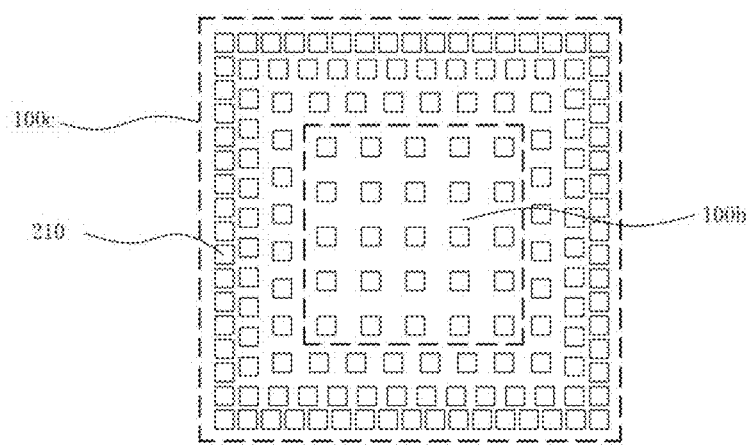
FIG. 9 is a schematic view of an arrangement of photosensitive units according to an embodiment of the present disclosure.

Referring to FIG. 9, the photosensitive performance may be further determined by the arrangement density of the photosensitive units 210, and the photosensitive performance is proportional to the arrangement density. The arrangement density of the photosensitive units 210 corresponding to the edge region 100c may be greater than the arrangement density of the photosensitive units 210 corresponding to the central region 100b. Specifically, the arrangement density of the photosensitive units 210 corresponding to the central region 100b may increase linearly in a direction from the central region 100b to the edge region 100c, or increase in a gradient. Correspondingly, the arrangement density of the photosensitive units 210 corresponding to the edge region 100c may increase linearly in a direction from the central region 100b to the edge region 100c, or increase in a gradient. Alternatively, the arrangement density of the photosensitive units 210 corresponding to the central region 100b may be uniformly distributed, and the arrangement density of the photosensitive units 210 corresponding to the edge region 100c may increase linearly in a direction from the central region 100b to the edge region 100c, or increase in a gradient. Configuration thereof may be adjusted as long as the arrangement density of the photosensitive units 210 corresponding to the edge region 100c is greater than the arrangement density of the photosensitive units 210 corresponding to the central region 100b. As shown in FIG. 9 as an example, the arrangement density of the photosensitive units 210 corresponding to the central region 100b is uniformly distributed, and the arrangement density of the photosensitive units 210 corresponding to the edge region 100c increases linearly in a direction from the central region 100b to the edge region 100c. In the embodiments, the arrangement density of the photosensitive units 210 corresponding to the edge region 100c is greater than the arrangement density of the photosensitive units 210 corresponding to the central region 100b, such that the photosensitive performance of the photosensitive units 210 corresponding to the edge region 100c is better than that of the photosensitive units 210 corresponding to the central region 100b, thereby increasing the brightness of a part in the fingerprint image corresponding to the edge region 100c sensed by the optical sensor 200. That is, the sharpness of the part in the fingerprint image corresponding to the edge region 100c may be improved, thereby improving the sensitivity of fingerprint recognition.

In other embodiments, the photosensitive performance may be further determined by the sensitivity of the photosensitive unit 210, and the photosensitive performance is proportional to the sensitivity of the photosensitive unit 210. The sensitivity of the photosensitive unit 210 corresponding to the edge region 100c is greater than the sensitivity of the photosensitive unit 210 corresponding to the central region 100b. In the embodiments, the sensitivity of the photosensitive unit 210 corresponding to the edge region 100c is greater than the sensitivity of the photosensitive unit 210 corresponding to the central region 100b, such that the photosensitive performance of the photosensitive unit 210 corresponding to the edge region 100c is better than that of the photosensitive unit 210 corresponding to the central region 100b, thereby increasing the brightness of a part in the fingerprint image corresponding to the edge region 100c sensed by the optical sensor 200. That is, the sharpness of the part in the fingerprint image corresponding to the edge region 100c may be improved, thereby improving the sensitivity of fingerprint recognition.

In some embodiments, the controller 300 is further configured to control the brightness of the light spot pattern displayed in the fingerprint recognition region 100a when the display panel 100 performs fingerprint recognition. The brightness in the edge region of the light spot pattern is greater than that in the central region of the light spot pattern. In the embodiments, the brightness of a part of the light spot pattern corresponding to the edge region 100c is greater than the brightness of a part of the light spot pattern corresponding to the central region 100b, thereby increasing the brightness of a part in the fingerprint image corresponding to the edge region 100c sensed by the optical sensor 200. That is, the sharpness of the part in the fingerprint image corresponding to the edge region 100c may be improved, thereby improving the sensitivity of fingerprint recognition.

Figure 10:
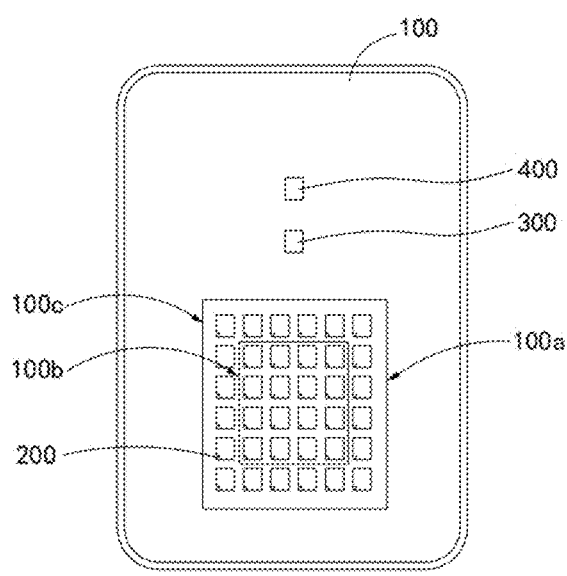
FIG. 10 is a structural schematic view of an electronic device according to further another embodiment of the present disclosure.
Figure 11:
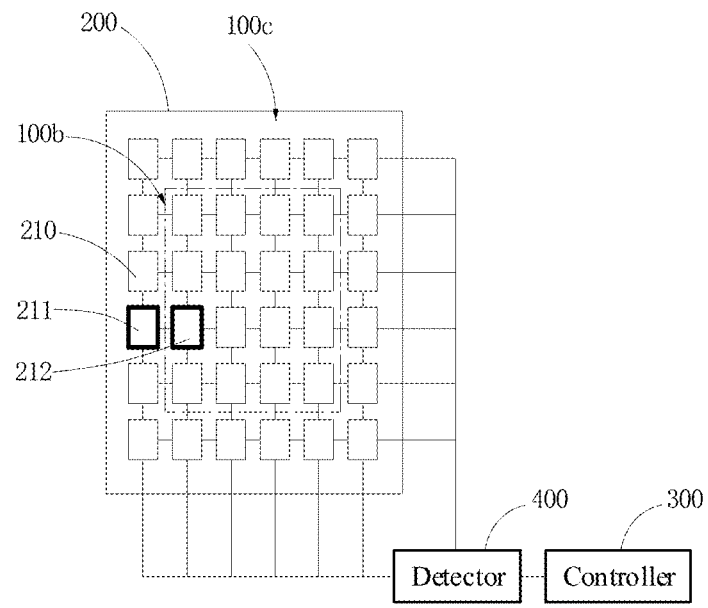
FIG. 11 is a schematic view of a connection between an optical sensor and a controller according to further another embodiment of the present disclosure.

Referring to FIGS. 10 and 11, the electronic device 1 may further include a detector 400. When the detector 400 detects that a target photosensitive unit 211 in the optical sensor 200 has been damaged, the detector 400 sends a feedback signal. The controller 300 is configured to control the exposure duration of a first photosensitive unit 212 adjacent to the target photosensitive unit 211 to be greater than a first preset duration based on the feedback signal. The first preset duration is an exposure duration of the first photosensitive unit 212 when the target photosensitive unit 211 is not yet damaged.

Specifically, when the target photosensitive unit 211 is damaged, a dark region may appear in a partial region of the fingerprint recognition region 100a corresponding to the target photosensitive unit 211. In order to compensate for the brightness of the target photosensitive unit 211, the exposure duration of the first photosensitive unit 212 adjacent to the target photosensitive unit 211 may be adjusted to be a target duration, and the target duration is greater than the first preset duration. Therefore, the partial darkening of the fingerprint recognition region 100a caused by the damage of the target photosensitive unit 211 is compensated, thus the overall brightness of the fingerprint recognition region 100a is improved, and the sensitivity of fingerprint recognition is improved.

The first photosensitive unit 212 may be one photosensitive unit 210 or a collection of multiple photosensitive units 210. When the first photosensitive unit 212 is a collection of multiple photosensitive units 210, the exposure durations of the multiple photosensitive units 210 may be adjusted to be consistent or inconsistent. The first photosensitive unit 212 is configured to compensate for the defect of partial darkening of the fingerprint recognition region 100a due to damage of the target photosensitive unit 211.

Further, when the first photosensitive unit 212 is arranged closer to the central region 100b relative to the target photosensitive unit 211, the exposure duration of the first photosensitive unit 212 is adjusted with a first increment based on the first preset duration. When the first photosensitive unit 212 is arranged closer to the edge region 100c relative to the target photosensitive unit 211, the exposure duration of the first photosensitive unit 212 is adjusted with a second increment based on the first preset duration, wherein the first increment is less than the second increment. Since the first increment is less than the second increment, when the first photosensitive unit 212 is closer to the edge region 100c relative to the target photosensitive unit 211, the adjustment of the exposure duration of the first photosensitive unit 212 will become more intense, thereby increasing the brightness of the edge region 100c while compensating for the brightness of the target photosensitive unit 211. In this way, the sharpness of the part in the fingerprint image corresponding to the edge region 100c may be improved, thereby improving the sensitivity of fingerprint recognition.

Figure 12:
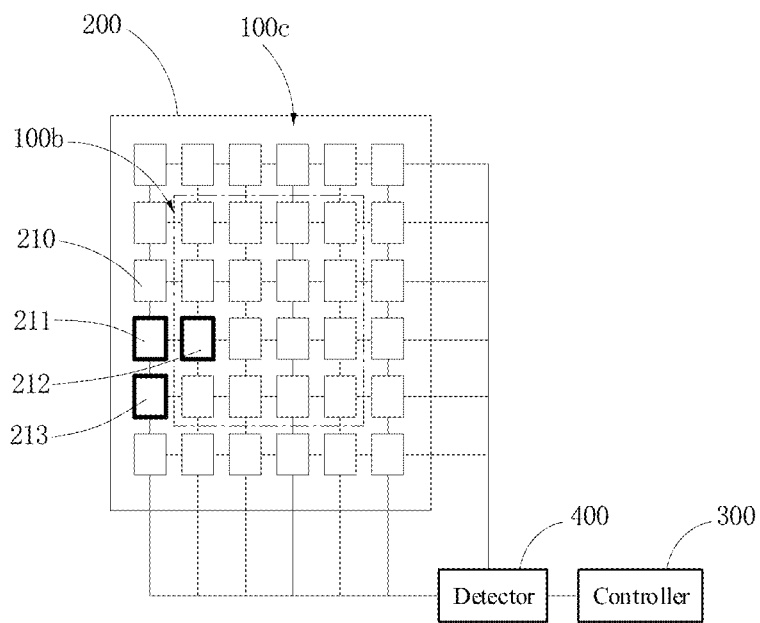
FIG. 12 is a schematic view of a connection between an optical sensor and a controller according to further another embodiment of the present disclosure.

Referring to FIG. 12, in some embodiments, the photosensitive units 210 may further include a second photosensitive unit 213 arranged adjacent to the target photosensitive unit 211. The first photosensitive unit 212 is arranged closer to a center of the optical sensor 200 relative to the second photosensitive unit 213. The controller 300 is also configured to control the exposure duration of the second photosensitive unit 213 to be greater than a second preset duration. The first preset duration is less than the second preset duration. The second preset duration is an exposure duration of the second photosensitive unit 213 when the target photosensitive unit 211 is not yet damaged.

Specifically, since the first photosensitive unit 212 and the second photosensitive unit 213 are both adjacent to the target photosensitive unit 211, when the target photosensitive unit 211 is damaged and the first photosensitive unit 212 is arranged closer to the central region 100b relative to the second photosensitive unit 213, the controller 300 is configured to control the exposure duration of the first photosensitive unit 212 to a first duration and control the exposure duration of the second photosensitive unit 213 to a second duration. The first duration is greater than the first preset duration, the second duration is greater than the second preset duration, and the first preset duration is greater than the second preset duration. In this case, the brightness of the edge region 100c may be increased, and the overall brightness of the fingerprint recognition region 100a may also be increased to compensate for the defect of partial darkening of the fingerprint recognition region 100a due to damage of the target photosensitive unit 211. In this way, the sharpness of the collected fingerprint image may be improved, thereby improving the sensitivity of fingerprint recognition. For example, the first exposure duration of the first photosensitive unit 212 is 0.05 s, the second exposure duration of the second photosensitive unit 213 is 0.08 s, the first preset duration is 0.04 s, and the second preset duration is 0.07 s.

Figure 13:
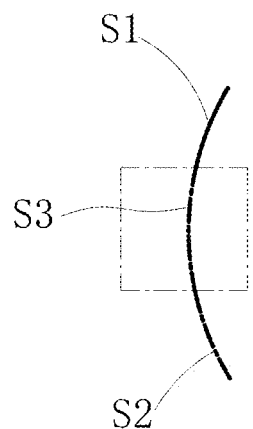
FIG. 13 is a schematic view of a fingerprint path fitting according to an embodiment of the present disclosure.

Referring to FIG. 13, in other embodiments, the photosensitive units 210 include a target photosensitive unit 211, a first photosensitive unit 212 and a second photosensitive unit 213, the first photosensitive unit 212 and the second photosensitive unit 213 being both arranged adjacent to the target photosensitive unit 211. When the target photosensitive unit 211 is damaged, the controller 300 is configured to perform fitting on the fingerprint pattern of the target object obtained by the first photosensitive unit 212 and that obtained by the second photosensitive unit 213 to obtain a fingerprint pattern corresponding to the target photosensitive unit 211.

Specifically, since the target photosensitive unit 211 is damaged, the target photosensitive unit 211 cannot collect fingerprint images. At this time, the fingerprint pattern corresponding to the target photosensitive unit 211 needs to be obtained by fitting the fingerprint patterns of the first photosensitive unit 212 and the second photosensitive unit 213 adjacent to the target photosensitive unit 211. The fingerprint pattern obtained by the first photosensitive unit 212 is referred to as S1, the fingerprint pattern obtained by the second photosensitive unit 213 is referred to as S2, and the fingerprint pattern corresponding to the target photosensitive unit 211 obtained after fitting is S3 as an example. The curvature of fingerprint pattern S3 corresponding to the target photosensitive unit 211 may be obtained by curve fitting based on a first curvature of the fingerprint pattern S1 collected by the first photosensitive unit 212 and a second curvature of the fingerprint pattern S2 collected by the second photosensitive unit 213. When the first curvature is equal to the second curvature, it may be considered that a target curvature of the fingerprint pattern S3 corresponding to the target photosensitive unit 211 is consistent with the first curvature and the second curvature. When the first photosensitive unit 212 is closer to the central region 100b than the second photosensitive unit 213, it can be considered that the first curvature of the fingerprint pattern S1 corresponding to the first photosensitive unit 212 is the target curvature of the fingerprint pattern S3 corresponding to the target photosensitive unit 211. In this case, the first curvature of the fingerprint pattern S1 corresponding to the first photosensitive unit 212 may be considered as the curvature of the fingerprint pattern S3 corresponding to the target photosensitive unit 211. In this way, it is not necessary to obtain the fingerprint pattern S3 corresponding to the target photosensitive unit 211 through other calculation methods, improving the efficiency of fingerprint image collection, shortening the time for collecting the fingerprint image, and improving the response speed of the optical sensor 200.

Figure 14:
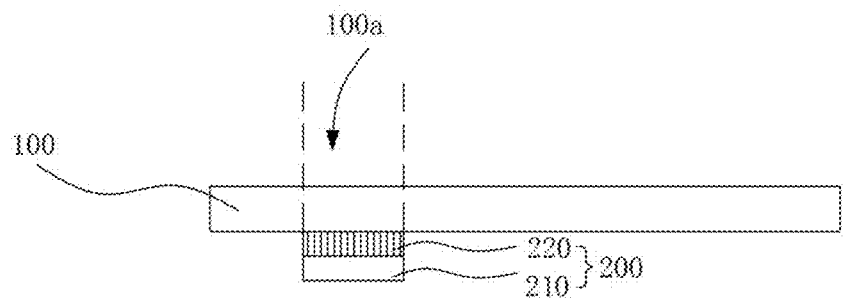
FIG. 14 is a cross-sectional structural schematic view of an electronic device according to an embodiment of the present disclosure.
Figure 15:
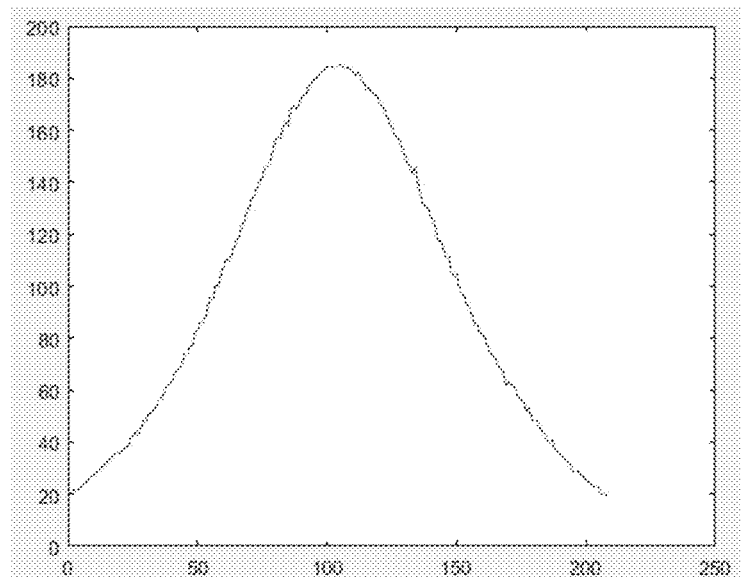
FIG. 15 is a schematic view of a photosensitive performance curve of a lens in the electronic device.
Figure 16:
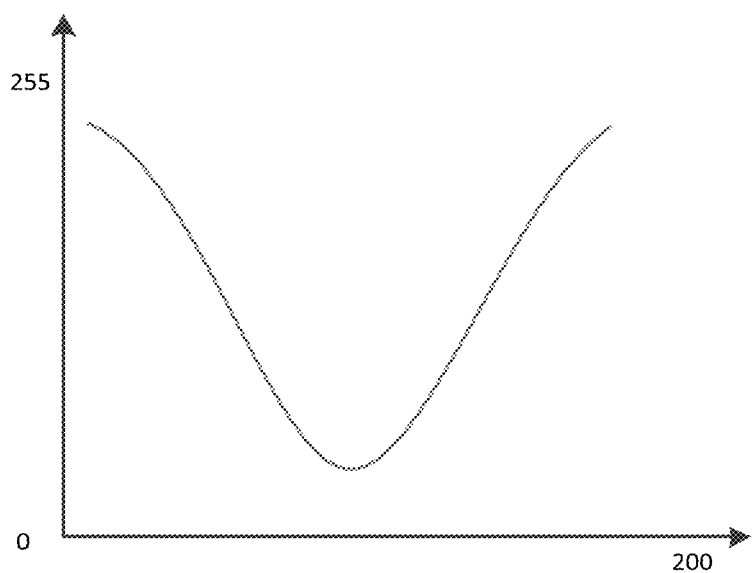
FIG. 16 is a schematic view of a photosensitive performance curve of a photosensitive unit.

Referring to FIGS. 14, 15 and 16, the optical sensor 200 includes a photosensitive unit 210 and a lens 220. The lens 220 is configured to focus the light incident from the display panel 100 to a corresponding photosensitive unit 210 and then transmit the light to the corresponding photosensitive unit 210. A central region of the lens 220 has a greater focus on the light than an edge region of the lens does. A focus curve of the lens 220 is complementary to a photosensitive performance curve of the corresponding photosensitive unit 210. The lens 220 is also called a collimator. When the performance parameter of the photosensitive unit 210 corresponding to the edge region 100c is equal to the performance parameter of the photosensitive unit 210 corresponding to the central region 100b, due to the characteristics of the lens 220, a part in the fingerprint image corresponding to the edge region 100c obtained by the optical sensor 200 is darker, and a part corresponding to the central region 100b is brighter, resulting in an inferior sharpness of the part in the fingerprint image corresponding to the edge region 100b. In the embodiments, the focus curve of the lens 220 is complementary to the photosensitive performance curve of the photosensitive unit 210, such that the sharpness of the part in the fingerprint image corresponding to the edge region 100c is improved, and the sharpness of the part in the fingerprint image corresponding to the edge region 100c is the same as the sharpness of the part in the fingerprint image corresponding to the central region 100b. That is, the overall sharpness of the fingerprint image is improved, thereby improving the sensitivity of fingerprint recognition.

Figure 17:
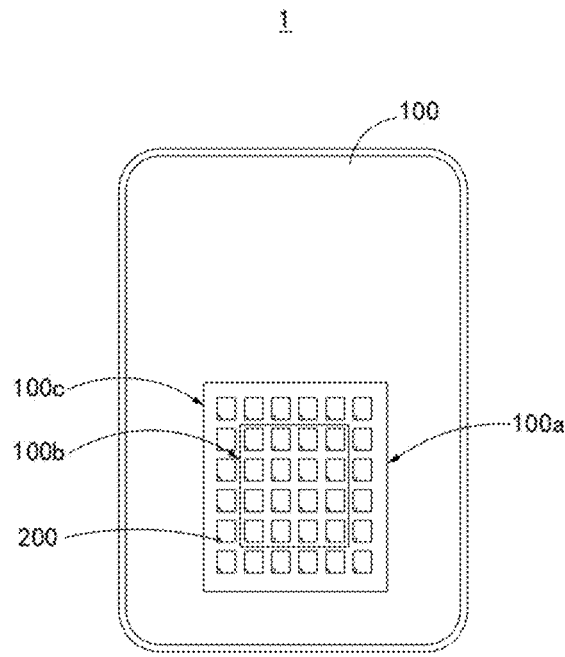
FIG. 17 is a structural schematic view of an electronic device according to further another embodiment of the present disclosure.

Referring to FIG. 17, the electronic device 1 includes a display panel 100 and an optical sensor 200. The display panel 100 has a fingerprint recognition region 100a. The fingerprint recognition region 100a includes a central region 100b and an edge region 100c surrounding the central region 100b. The optical sensor 200 is arranged corresponding to the fingerprint recognition region 100a. The optical sensor 200 is configured to collect a fingerprint image of a target object. Photosensitive performance of a region of the optical sensor 200 corresponding to the edge region 100c is better than that of a region of the optical sensor 200 corresponding to the central region 100b.

Specifically, the optical sensor 200 has a plurality of photosensitive units 210, and a performance parameter of the photosensitive unit 210 corresponding to the edge region 100c is better than the performance parameter of the photosensitive unit 210 corresponding to the central region 100b.

In the embodiment, the performance parameter of the photosensitive unit 210 corresponding to the edge region 100c is better than the performance parameter of the photosensitive unit 210 corresponding to the central region 100b, which may mean: a comprehensive performance parameter of the photosensitive units 210 corresponding to the edge region 100c is better than that of the photosensitive units 210 corresponding to the central region 100b, when manufacturing the photosensitive units 210 of the optical sensor 200. And after the performance parameters of the photosensitive unit 210 are completely configured, the performance parameters of the photosensitive units 210 will not be adjusted. That is, the performance parameters of the photosensitive units 210 have been maintained, and there is no problem of later adjustment.

The performance parameter may be represented by a gain of the photosensitive unit 210, an exposure duration of the photosensitive unit 210, an arrangement density of the photosensitive units 210, and a sensitivity of the photosensitive unit 210.

In some embodiments, the optical sensor 200 includes a plurality of photosensitive units 210, the photosensitive performance is at least determined by the gain of the photosensitive unit 210, and the photosensitive performance is proportional to the gain. The gain of the photosensitive unit 210 corresponding to the edge region 100c is greater than the gain of the photosensitive unit 210 corresponding to the central region 100b.

Figure 18:
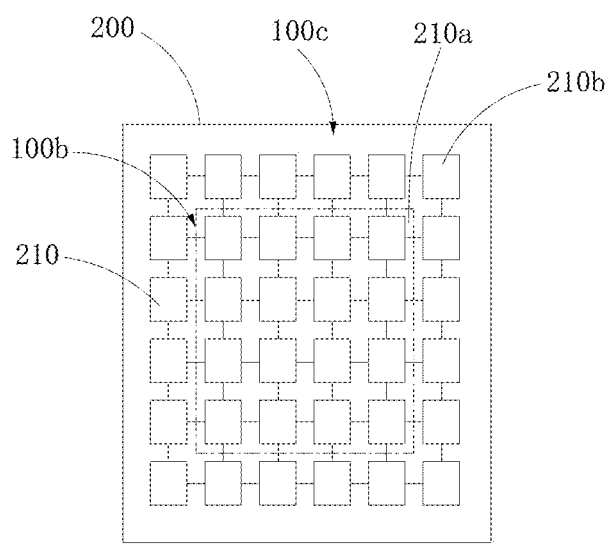
FIG. 18 is a structural schematic view of an optical sensor according to an embodiment of the present disclosure.

Referring to FIG. 18, in other embodiments, the optical sensor 200 includes a plurality of photosensitive units 210, the photosensitive performance is at least determined by the gain of the photosensitive unit 210, and the photosensitive performance is proportional to the gain. The plurality of photosensitive units 210 may be divided into a first photosensitive unit group 210a and a second photosensitive unit group 210b. The first photosensitive unit group 210a is arranged corresponding to the central region 100b, and the second photosensitive unit group 210b is arranged corresponding to the edge region 100c. The gain of the first photosensitive unit group 210a gradually increases in a direction from the central region 100b to the edge region 100c, and the gain of the second photosensitive unit group 210b gradually increases in the direction from the central region 100b to the edge region 100c. The gain of the photosensitive unit 210 in the first photosensitive unit group 210a is less than the gain of the photosensitive unit 210 in the second photosensitive unit group 210b.

Figure 19:
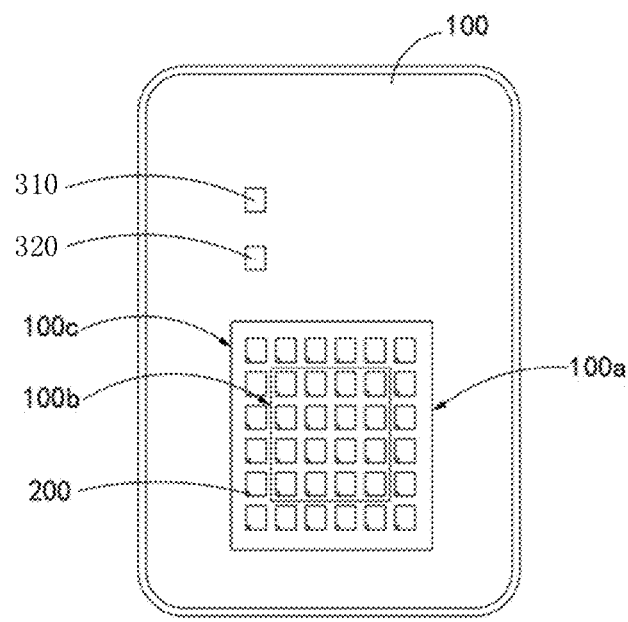
FIG. 19 is a structural schematic view of an electronic device according to further another embodiment of the present disclosure.

Referring to FIG. 19, in other embodiments, the optical sensor 200 includes a plurality of photosensitive units 210, the photosensitive performance is at least determined by the gain of the photosensitive unit 210, and the photosensitive performance is proportional to the gain. The electronic device 1 further includes a filtering unit 310 and an amplifying unit 320. The photosensitive unit 210 is configured to receive a detection signal, and the filtering unit 310 is configured to filter out a clutter in the detection signal. The amplifying unit 320 is configured to amplify the amplitude of the detection signal from which the clutter has been filtered out. That is, the amplifying unit 320 is configured to adjust the gain of the photosensitive unit 210. The gain of the photosensitive unit 210 is proportional to an amplification factor of the amplifying unit 320.

In still other embodiments, the optical sensor 200 includes a plurality of photosensitive units 210, the photosensitive performance is further determined by the exposure duration of the photosensitive unit 210, and the photosensitive performance is proportional to the exposure duration. The exposure duration of the photosensitive unit 210 corresponding to the edge region 100c is greater than the exposure duration of the photosensitive unit 210 corresponding to the central region 100b.

In still other embodiments, the optical sensor 200 includes a plurality of photosensitive units 210, the photosensitive performance is further determined by the arrangement density of the photosensitive units 210, and the photosensitive performance is proportional to the arrangement density. The arrangement density of the photosensitive units 210 corresponding to the central region 100b is less than the arrangement density of the photosensitive units 210 corresponding to the edge region 100c.

Specifically, the arrangement density of the photosensitive units 210 corresponding to the edge region 100c is greater, and the arrangement density of the photosensitive units 210 corresponding to the central region 100b is less. Thus, where other conditions are the same, the performance parameter of the photosensitive unit 210 corresponding to the edge region 100c may be further improved, thereby complementing the optical characteristics of the optical sensor 200, which is bright at the center and dark at the edges, thereby improving the overall brightness of the fingerprint recognition region 100a, improving the sharpness of the collected fingerprint image, and further improving the sensitivity of fingerprint recognition.

In still other embodiments, the optical sensor 200 includes a plurality of photosensitive units 210, the photosensitive performance is further determined by the sensitivity of the photosensitive unit 210, and the photosensitive performance is proportional to the sensitivity of the photosensitive unit 210. The plurality of photosensitive units 210 are uniformly distributed, and the sensitivity of the photosensitive unit 210 corresponding to the central region 100b is lower than the sensitivity of the photosensitive unit 210 corresponding to the edge region 100c.

Specifically, the sensitivity of the photosensitive unit 210 corresponding to the edge region 100c is relatively high, and the sensitivity of the photosensitive unit 210 corresponding to the central region 100b is low. Thus, where other conditions are the same, the performance parameter of the photosensitive unit 210 corresponding to the edge region 100c may be further improved, thereby complementing the optical characteristics of the optical sensor 200, which is bright at the center and dark at the edges, thereby improving the overall brightness of the fingerprint recognition region 100a, improving the sharpness of the collected fingerprint image, and further improving the sensitivity of fingerprint recognition.

In the related art, as for optical fingerprint technologies, a bright uniform spot pattern of the display screen is adopted to fill light. The fingerprint image formed by the optical sensor 200 will appear darker at edges and brighter at the center, due to optical characteristics of lens of the optical fingerprint sensor 200. In this way, the fingerprint pattern at the center of the central region 110a will appear overexposed, and the imaging is blurred at the edges of the central region 110a, reducing the sensitivity of fingerprint recognition. In the embodiments of the present disclosure, the electronic device 1 includes a display panel 100 and an optical sensor 200. The optical sensor 200 is arranged corresponding to a fingerprint recognition region 100a. The optical sensor 200 is configured to collect a fingerprint image of a target object. The fingerprint recognition region 100a includes a central region 100b and an edge region 100c surrounding the central region 100b. The performance parameter of the photosensitive unit 210 corresponding to the edge region 100c is better than the performance parameter of the photosensitive unit 210 corresponding to the central region 100b, which complements the optical properties of the optical sensor 200 with the lens appearing bright at the center and dark at the edges, making the brightness of the whole fingerprint recognition region 100a even and consistent, thereby improving the overall sharpness of the collected fingerprint image and thus the sensitivity of fingerprint recognition.

Figure 20:
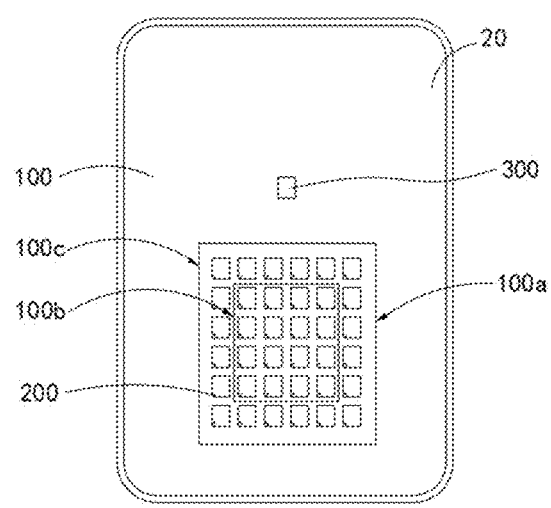
FIG. 20 is a structural schematic view of an electronic device according to further another embodiment of the present disclosure.

Referring to FIG. 20, the electronic device 1 may further include a cover 20. The cover 20 may be, but not limited to, a glass cover plate. When performing fingerprint image collection, the optical sensor 200 is configured to receive target light incident from the cover 20. The target light carries fingerprint information of the target object. The optical sensor 200 is configured to convert the target light carrying the fingerprint information of the target object into an electric signal carrying the fingerprint information of the target object. The controller 300 is configured to generate a fingerprint image of the target object based on the electric signal carrying the fingerprint information of the target object. The controller 300 is configured to compare the fingerprint image of the target object with a preset fingerprint image to determine whether the fingerprint image of the target object matches the preset fingerprint image. When the fingerprint image of the target object matches the preset fingerprint image, the electronic device 1 may be unlocked, or configured to verify a mobile payment in a payment software installed in the electronic device 1, or configured to verify a password in a communication software installed in the electronic device 1, etc.

Figure 21:
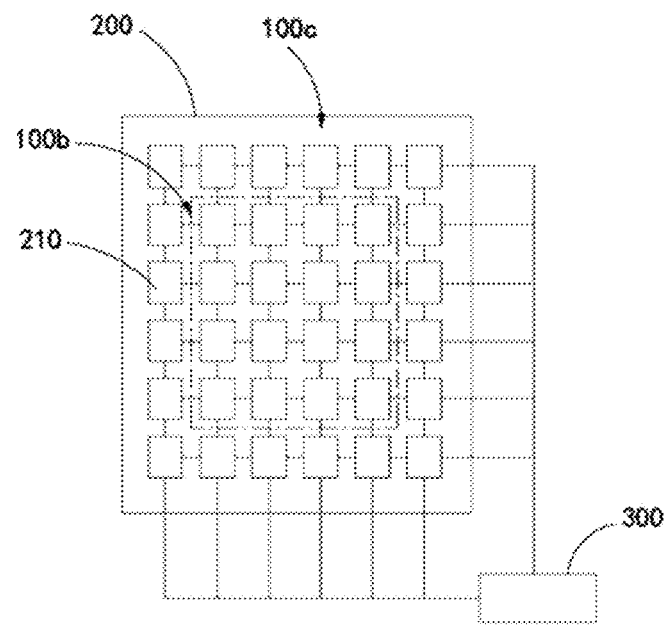
FIG. 21 is a cross-sectional structural schematic view of an electronic device according to another embodiment of the present disclosure.

Referring to FIG. 21, the electronic device 1 includes a display panel 100, an optical sensor 200, and a controller 300. The display panel 100 includes a fingerprint recognition region 100a. The fingerprint recognition region 100a includes a central region 100b and an edge region 100c surrounding the central region 100b. The optical sensor 200 is arranged corresponding to the fingerprint recognition region 100a. The optical sensor 200 is configured to collect a fingerprint image of a target object. When fingerprint image collection is performed, the controller 300 is configured to control the brightness of the central region 100b to be less than the brightness of the edge region 100c.

The display panel 100 may be a liquid crystal display panel or an organic light emitting diode display panel. The shape of the fingerprint recognition region 100a may be circular, rectangular, etc.

The optical sensor 200 generally refers to a device that can sense light energy from ultraviolet light to infrared light and convert the light energy into an electrical signal. The light signal recognized by the optical sensor 200 may be visible light or invisible light.

For example, the light signal is visible light, and a photoelectric effect occurs when a photosensitive layer of the optical sensor 200 senses the visible light. For example, the material of the photosensitive layer of the optical sensor 200 may be a silicon-rich compound, including but not limited to silicon-rich silicon oxide ($SiO_x$), silicon-rich silicon nitride ($SiN_y$), silicon-rich silicon oxynitride ($SiO_xN_y$), etc., where x, y is a positive integer, such as x=2, y=2. The material of an input end of the optical sensor 200 may be transparent and conductive. The transparent conductive material may be, but is not limited to, indium tin oxide (ITO). The light signal passes through the input end of the optical sensor 200 and enters the photosensitive layer of the optical sensor 200.

The controller 300 may be a central processing unit or a microprocessor.

The target object may touch the fingerprint recognition region 100a to achieve the function of collecting and matching the fingerprint image of the target object. The target object may be a user. The optical sensor 200 is arranged corresponding to the fingerprint recognition region 100a. Further, the optical sensor 200 may be arranged directly facing the central region 100b of the fingerprint recognition region 100a, such that the optical sensor 200 can collect relatively complete fingerprint images, thereby improving the sensitivity of fingerprint recognition.

In the related art, as for optical fingerprint technologies, a bright uniform spot pattern of the display screen is adopted to fill light. The fingerprint image formed by the optical sensor 200 will appear darker at edges and brighter at the center, due to optical characteristics of lens of the optical fingerprint sensor 200. In this way, the fingerprint pattern at the center of the central region 110a will appear overexposed, and the imaging is blurred at the edges of the central region 110a, reducing the sensitivity of fingerprint recognition. In the embodiments of the present disclosure, the electronic device 1 includes a display panel 100, an optical sensor 200, and a controller 30. The optical sensor 200 is arranged corresponding to a fingerprint recognition region 100a. The optical sensor 200 is configured to collect a fingerprint image of a target object. The fingerprint recognition region 100a includes a central region 100b and an edge region 100c surrounding the central region 100b. When fingerprint image collection is performed, the controller 30 is configured to control the brightness of the central region 100b to be less than the brightness of the edge region 100c, such that the brightness of the overall fingerprint recognition region 100a may remain uniform, thereby improving the sharpness of the collected fingerprint image and thus the sensitivity of fingerprint recognition.

Figure 22:
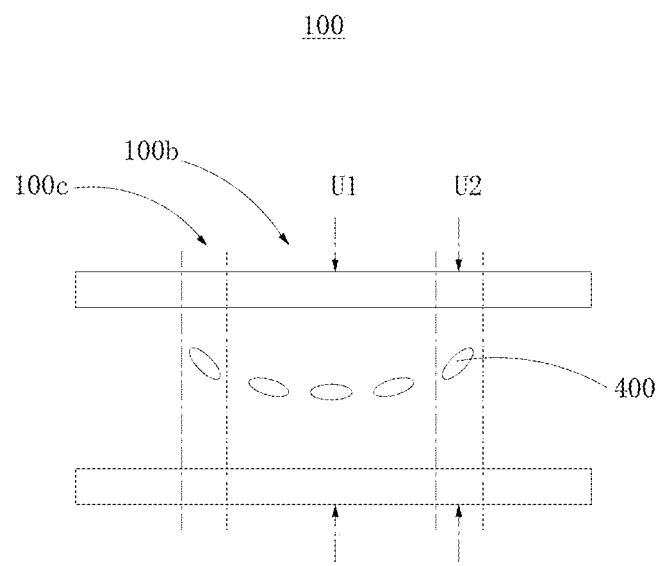
FIG. 22 is a cross-sectional structural schematic view of an electronic device according to further another embodiment of the present disclosure.

Referring to FIG. 22, the display panel 100 includes a liquid crystal layer 400. When fingerprint image collection is performed, the controller 300 is configured to control a part of the liquid crystal layer 400 corresponding to the central region 100b to be loaded with a first driving voltage U1 and control a part of the liquid crystal layer 400 corresponding to the edge region 100c to be loaded with a second driving voltage U2. The voltage value of the first driving voltage U1 is less than the voltage value of the second driving voltage U2.

Specifically, parts of the liquid crystal layer 400 corresponding to different regions of the fingerprint recognition region 100a are controlled by independent driving voltages. When the voltage value of the first driving voltage U1 applied to the part of the liquid crystal layer 400 corresponding to the central region 100b of the fingerprint recognition region 100a is less than the voltage value of the second driving voltage U2 applied to the part of the liquid crystal layer 400 corresponding to the edge region 100c of the region 100a, under same other conditions, a deflection angle of the part of the liquid crystal layer 400 corresponding to the central region 100b is less than that of the part of the liquid crystal layer 400 corresponding to the edge region 100c. In this case, the part of the liquid crystal layer 400 corresponding to the edge region 100c will allow more light to pass, such that the brightness of the edge region 100c is greater than the brightness of the central region 100b, thereby improving the sharpness of the collected fingerprint image and thus the sensitivity of fingerprint recognition.

In some embodiments, the voltage value of the first driving voltage U1 is a constant value, the voltage value of the second driving voltage U2 is also a constant value, and the voltage value of the first driving voltage U1 is less than the voltage value of the second driving voltage U2. That is, the first driving voltage U1 applied to the part of the liquid crystal layer 400 corresponding to the central region 100b and the second driving voltage U2 applied to the part of the liquid crystal layer 400 corresponding to the edge region 100c are constant values. For example, the first driving voltage U1 applied to the part of the liquid crystal layer 400 corresponding to the central region 100b is 3.8V, and the second driving voltage U2 applied to the part of the liquid crystal layer 400 corresponding to the edge region 100c is 5V, such that the brightness of the central region 100b is less than that of the edge region, thereby complementing the optical characteristics of the lens of the optical sensor 200, improving the sharpness of the collected fingerprint image, and further improving the sensitivity of fingerprint recognition.

In other embodiments, the first driving voltage U1 is a set of multiple voltage values, the second driving voltage U2 is also a set of multiple voltage values, and a maximum value of the multiple voltage values in the first driving voltage U1 is less than a minimum value of the multiple voltage values in the second driving voltage U2. The first driving voltage U1 and the second driving voltage U2 decrease sequentially from the central region 100b towards the edge region 100c. For example, the first driving voltage U1 may include voltage values of 3.8V, 4.0V, and 4.2V. The second driving voltage U2 may include voltage values of 4.6V, 4.8V, and 5V. The voltage value of a junction part between the edge region 100c and the central region 100b may be 4.4V. The voltage value applied to the part of the liquid crystal layer 400 corresponding to an exact center part of the central region 100b may be 3.8V. The voltage value applied to the part of the liquid crystal layer 400 corresponding to an edge contour part of the edge region 100c may be 5V. In this way, the brightness gradually increases from the central region 100b toward the edge region 100c, thereby complementing the optical characteristics of the lens of the optical sensor 200, improving the sharpness of the collected fingerprint image, and further improving the sensitivity of fingerprint recognition.

Figure 23:
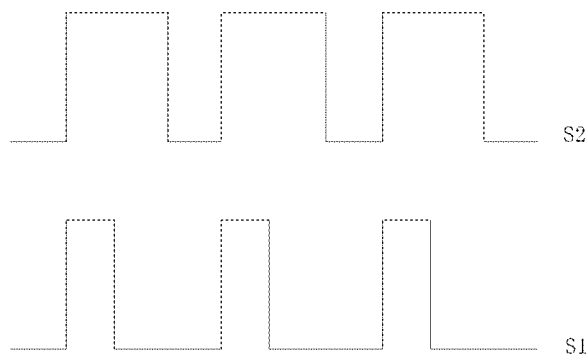
FIG. 23 is a schematic view of a relationship between a first pulse modulation signal applied to a part of the liquid crystal layer corresponding to the central region and a second pulse modulation signal applied to a part of the liquid crystal layer corresponding to the edge region in the electronic device shown in FIG. 22.

Further referring to FIG. 23, the display panel 100 includes a liquid crystal layer 400. When fingerprint image collection is performed, the controller 300 is configured to control the liquid crystal layer 400 corresponding to the central region 100b to be loaded with a first pulse modulation signal S1 and control the liquid crystal layer 400 corresponding to the edge region 100c to be loaded with a second pulse modulation signal S2. The duty ratio of the first pulse modulation signal S1 is less than the duty ratio of the second pulse modulation signal S2.

The pulse modulation signal is a discrete signal with various shapes. Compared with ordinary analog signals (such as sine waves), waveforms of the pulse modulation signal are not continuous on the time axis (that is, there is a clear interval between adjacent waveforms) but have a certain periodicity. The most common pulse wave is a rectangular wave (that is, a square wave). The pulse modulation signal can be configured to express information, can also be configured as a carrier (such as pulse code modulation (PCM), pulse width modulation (PWM) in pulse modulation, etc.), and can also be configured as a clock signal for various digital circuits and high-performance chips.

The duty ratio refers to a percentage of a duration wherein a circuit is turned on in an overall circuit operation period. For a pulse width modulation signal, the duty ratio of the pulse width modulation signal is equal to a ratio of a pulse width to a signal period. For example, in cases that the pulse width of the first pulse width modulation signal S1 is 1 µs and the signal period is 4 µs, the duty ratio of the first pulse width modulation signal S1 is 1/4=0.25.

In some embodiments, the first pulse modulation signal S1 and the second pulse modulation signal S2 are both square wave signals. The period of the waveforms corresponding to the first pulse modulation signal S1 is consistent with the period of the waveforms corresponding to the second pulse modulation signal S2. The width of the waveform corresponding to the first pulse modulation signal S1 is less than the width of the waveform of the second pulse modulation signal S2. In this case, the duty ratio of the first pulse modulation signal S1 is less than the duty ratio of the second pulse modulation signal S2, such that the brightness of the edge region 100c and the central region 100b may be improved, and the brightness of the edge region 100c may be greater than that of the central region 100b, thereby complementing the optical characteristics of the lens of the optical sensor 200, improving the sharpness of the collected fingerprint image, and further improving the sensitivity of fingerprint recognition.

It can be understood that, in other embodiments, the periods of the first pulse modulation signal S1 and the second pulse modulation signal S2 may also be different, as long as the duty ratio of the first pulse modulation signal S1 is remained less than that of the second pulse modulation signal S2.

By adjusting the duty ratios of the first pulse modulation signal S1 applied to the liquid crystal layer 400 corresponding to the central region 100b and the second pulse modulation signal S2 applied to the liquid crystal layer 400 corresponding to the edge region 100c, an energization time length at both ends of the liquid crystal layer 400 corresponding to the central region 100b may be changed, and an energization time length at both ends of the liquid crystal layer 400 corresponding to the edge region 100c may be changed. When the duty ratio of the first pulse modulation signal S1 is less than the duty ratio of the second pulse modulation signal S2, it means that the duration of the voltage applied to the liquid crystal layer 400 corresponding to the central region 100b is less than that of the voltage applied to the liquid crystal layer 400 corresponding to the edge region 100c, such that the liquid crystal layer 400 corresponding to the edge region 100c can allow more light to pass, and the brightness of the edge region 100c may be improved, thereby complementing the optical characteristics of the optical sensor 200, which is bright at the center and dark at the edges, improving the sharpness of the collected fingerprint image, and further improving the sensitivity of fingerprint recognition.

Figure 24:
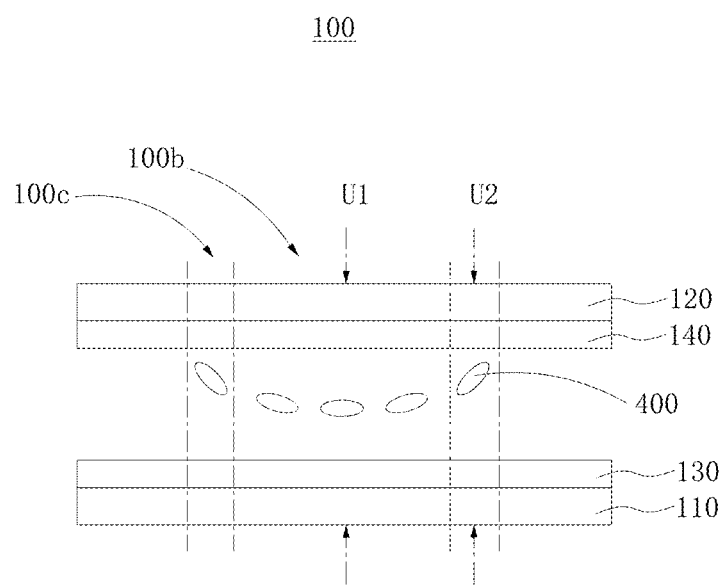
FIG. 24 is a cross-sectional structural schematic view of an electronic device according to further another embodiment of the present disclosure.

Referring to FIG. 24, in some embodiments, the display panel 100 may further include an array substrate 110 and a color film substrate 120 that are stacked and spaced apart. A side of the array substrate 110 adjacent to the color film substrate 120 is arranged with a pixel electrode 130. A side of the color film substrate 120 adjacent to the array substrate 110 is arranged with a common electrode 140. The liquid crystal layer 400 is arranged between the pixel electrode 130 and the common electrode 140.

The array substrate 110 may be a flexible substrate, and the flexible substrate may be a composite of polyimide film (PI) or polyester film and copper foil. Due to excellent properties of polyimide, such as high temperature soldering resistance, high strength, high modulus, flame retardancy, etc., polyimide as a polymer material has outstanding thermal stability, good radiation resistance and chemical stability, and excellent mechanics performance.

Specifically, when the liquid crystal layer 400 is arranged between the pixel electrode 130 and the common electrode 140, a voltage difference may be formed between the pixel electrode 130 and the common electrode 140, such that the liquid crystal layer 400 arranged between the pixel electrode 130 and the common electrode 140 generates a deflection angle, thereby changing the amount of light passing through the liquid crystal layer 400. When the voltage difference applied at both ends of the liquid crystal layer 400 corresponding to the central region 100b is less than the voltage difference applied at both ends of the liquid crystal layer 400 corresponding to the edge region 100c, the brightness of the central region 100b may be made less than the brightness of the edge region 100c, thereby complementing the optical characteristics of the lenses of the optical sensor 200, which is bright at the center and dark at the edges, improving the sharpness of the collected fingerprint image, and improving the sensitivity of fingerprint recognition.

Figure 25:
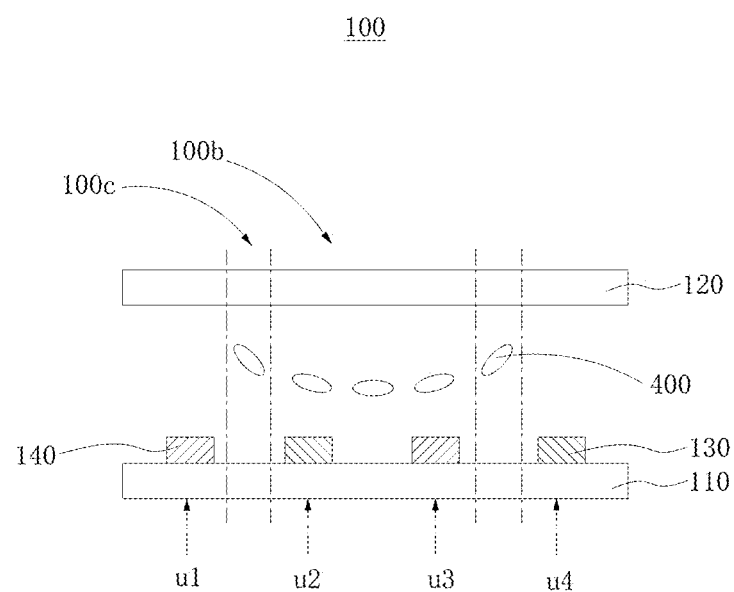
FIG. 25 is a cross-sectional structural schematic view of an electronic device according to further another embodiment of the present disclosure.

Referring to FIG. 25, in other embodiments, the display panel 100 may further include an array substrate 110 and a color film substrate 120 that are stacked and spaced apart, and also include a pixel electrode 130 and a common electrode 140. The pixel electrode 130 and the common electrode 140 are both arranged on the array substrate 110. The liquid crystal layer 400 is arranged between the pixel electrode 130 and the color film substrate 120.

Specifically, the pixel electrode 130 and the common electrode 140 are arranged in a same layer at intervals, and are both arranged on the array substrate 110. A voltage difference may be formed between the pixel electrode 130 and the common electrode 140, such that the liquid crystal layer 400 arranged between the pixel electrode 130 and the common electrode 140 generates a deflection angle, thereby changing the amount of light passing through the liquid crystal layer 400. Moreover, since the pixel electrode 130 and the common electrode 140 are arranged in the same layer at intervals, the thickness of the display panel 100 may be reduced, compared to that the pixel electrode 130 and the common electrode 140 are stacked and arranged at intervals, realizing a light and thin design of the display panel 100. When the voltage difference applied to the liquid crystal layer 400 corresponding to the central region 100b is less than the voltage difference applied to the liquid crystal layer 400 corresponding to the edge region 100c, the brightness of the central region 100b may be less than the brightness of the edge region 100c, thereby complementing the optical characteristics of the lens of the optical sensor 200, which is bright at the center and dark at the edges, improving the sharpness of the collected fingerprint image, and improving the sensitivity of fingerprint recognition. There is a voltage difference between adjacent ones of u1, u2, u3, and u4. In some embodiments, the voltage difference between u1 and u2 is a first difference, the voltage difference between u3 and u4 is a second difference, and the first difference may be equal to the second difference. The voltage difference between u2 and u3 is a third difference, and the first difference is greater than the third difference.

Figure 26:
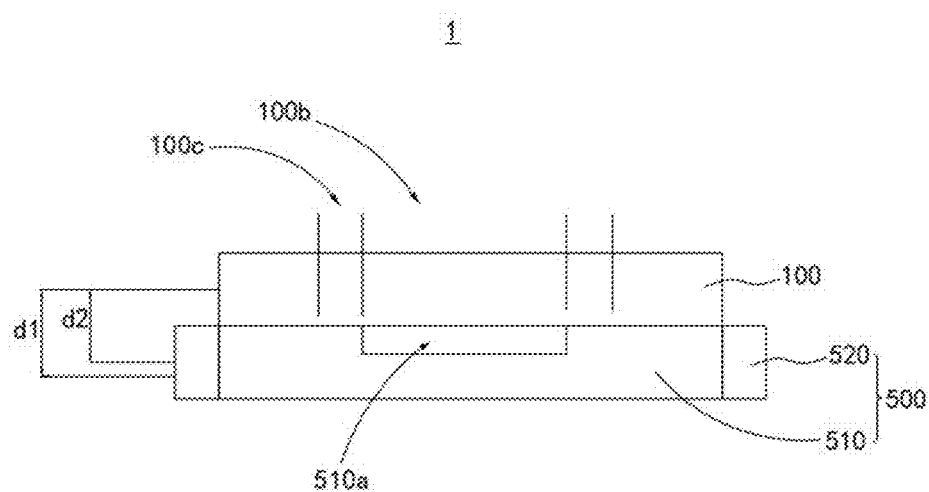
FIG. 26 is a cross-sectional structural schematic view of an electronic device according to further another embodiment of the present disclosure.

Referring to FIG. 26, the electronic device 1 may further include a backlight module 500. The backlight module 500 may include a light guide plate 510 and a light source 520 arranged on a side of the light guide plate 510. Light from the light source 520 is transmitted through the light guide plate 510 to the display panel 100. The distance between a part of the light guide plate 510 facing the central region 100b and the display panel 100 is a first distance d1, and the distance between a part of the light guide plate 510 facing the edge region 100c and the display panel 100 is a second distance d2. The first distance d1 is greater than the second distance d2.

In some embodiments, the light guide plate 510 may define a groove 510a, and the groove 510a directly faces the central region 100b, such that the first distance d1 between the part of the light guide plate 510 facing the central region 100b and the display panel 100 is greater than the second distance d2 between the part of the light guide plate 510 facing the edge region 100c and the display panel 100. Due to light loss in the propagation of light in the air, the light reaching the central region 100b is less than the light reaching the edge region 100c, such that the brightness of the edge region 100c is greater than the brightness of the central region 100b, thereby complementing the optical characteristics of the lens of the optical sensor 200, which is bright at the center and dark at the edges, improving the sharpness of the collected fingerprint image, and improving the sensitivity of fingerprint recognition.

In other embodiments, a part of the light guide plate 510 corresponding to the central region 100b is arranged with scattering particles configured to disperse the light emitted from the light guide plate 510, such that the light emitted from the light guide plate 510 is dispersed in all directions. Since the part of the light guide plate 510 corresponding to the central region 100b is arranged with the scattering particles, and the part of the light guide plate 510 corresponding to the edge region 100c is free of the scattering particles, the light emitted from the part of the light guide plate 510 corresponding to the central region 100b will be scattered, such that the amount of light reaching the central region 100b is less than the amount of light reaching the edge region 100c. In this way, the brightness of the edge region 100c is greater than the brightness of the central region 100b, thereby complementing the optical characteristics of the lens of the optical sensor 200, which is bright at the center and dark at the edges, enabling the fingerprint recognition region 100a to present a uniform brightness, improving the sharpness of the collected fingerprint image, and improving the sensitivity of fingerprint recognition.

Further, the density of the scattering particles gradually decreases from the exact center part of the central region 100b towards the edge part of the central region 100b. The greater the density of the scattering particles, the more obvious the light scattering effect, which makes the light difficult to aggregate, reducing the amount of light reaching the central region 100b. In this way, the brightness of the central region 100b is less than the brightness of the edge region 100c, thereby complementing the optical characteristics of the lens of the optical sensor 200, which is bright at the center and dark at the edges, improving the sharpness of the collected fingerprint image, and improving the sensitivity of fingerprint recognition.

In other embodiments, the light guide plate 510 may be arranged with a light-shielding layer at a position corresponding to the central region 100b. The light-shielding layer is configured to absorb part of the light, thereby reducing the amount of light reaching the central region 100b under same conditions. In this way, the brightness of the central region 100b is less than the brightness of the edge region 100c, thereby complementing the optical characteristics of the lens of the optical sensor 200, which is bright at the center and dark at the edges, improving the sharpness of the collected fingerprint image, and improving the sensitivity of fingerprint recognition. The light-shielding layer may be a filter or a polarizer.

Figure 27:
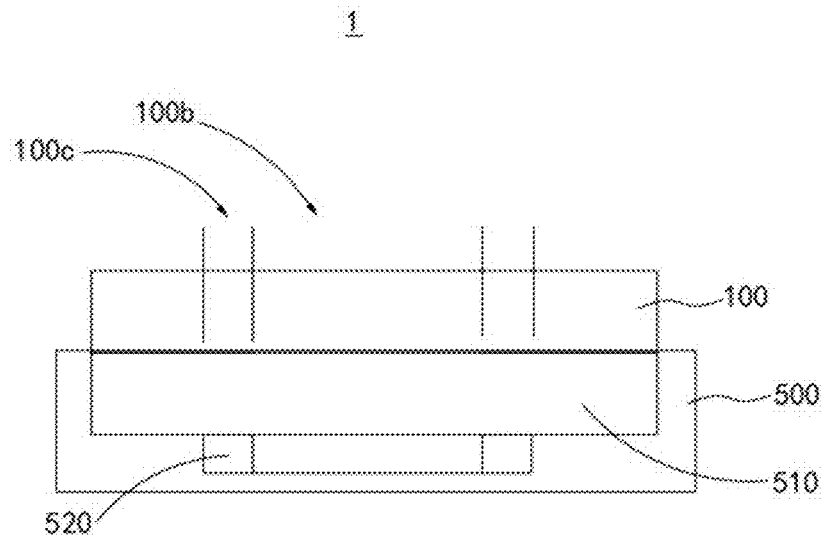
FIG. 27 is a cross-sectional structural schematic view of an electronic device according to further another embodiment of the present disclosure.

Referring to FIG. 27, the electronic device 1 may further include a backlight module 500. The backlight module 500 may include a light guide plate 510 and a light source 520. The light source 520 is arranged on a side of the light guide plate 510 away from the display panel 100. Light emitted by the light source 520 is transmitted to the display panel 100 through the light guide plate 510. The light source 520 is arranged corresponding to the edge region 100c.

Specifically, since the light source 520 is arranged on the side of the light guide plate 510 away from the display panel 100, and the light source 520 is arranged corresponding to the edge region 100c, the distance between the light source 520 and the edge region 100c is less than the distance between the light source 520 and the central region 100b. In this case, more light from the light source 520 may irradiate the edge region 100c, such that under same conditions, the brightness of the edge region 100c and the central region 100b may be increased at the same time, and the brightness of the edge region 100c may be increased more obviously, thereby complementing the optical characteristics of the lens of the optical sensor 200, which is bright at the center and dark at the edges, improving the sharpness of the collected fingerprint image, and improving the sensitivity of fingerprint recognition.

In some embodiments, the light source 520 may be substantially ring-shaped and surround the central region 100b. The light source 520 may include a plurality of point light sources. The point light sources may be uniformly distributed in a ring shape, such that the edge region 100c may be uniformly illuminated, thereby complementing the optical characteristics of the lens of the optical sensor 200, which is bright at the center and dark at the edges, improving the sharpness of the collected fingerprint image, and improving the sensitivity of fingerprint recognition.

Figure 28:
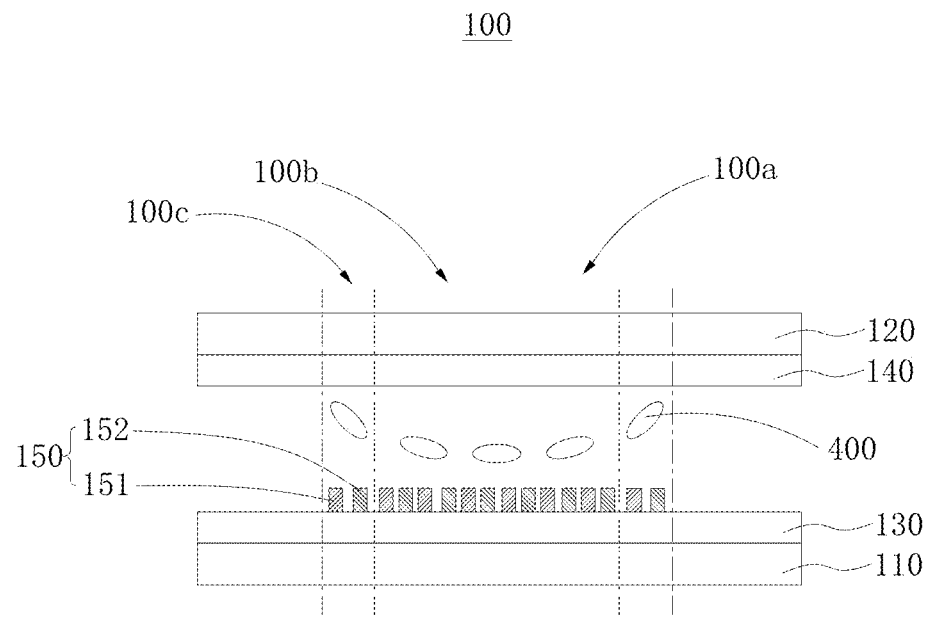
FIG. 28 is a cross-sectional structural schematic view of an electronic device according to further another embodiment of the present disclosure.

Referring to FIG. 28, the display panel 100 may further include a color resist layer 150. A part of the color resist layer 150 facing the fingerprint recognition region 100a is arranged with a green color resist 151 and a blue color resist 152 arranged at intervals.

Specifically, the green color resist 151 may be arranged at the corresponding part of the fingerprint recognition region 100a, such that the background noise of the display panel 100 and the collected fingerprint image are more balanced, while the arranged blue color resist 152 may make the contrast of the collected fingerprint image more obvious. Therefore, the green color resistors 151 and the blue color resistors 152 are arranged at intervals, thereby increasing the contrast of the collected fingerprint image, improving the quality of the collected fingerprint image, and further improving the accuracy of optical fingerprint recognition.

In some embodiments, a light-emitting area of the green color resistor 151 and that of the blue color resistor 152 remain the same. In this way, the noise of the collected fingerprint image may be less, and the contrast may be higher, such that the collected fingerprint image is more coordinated, thereby improving the accuracy of the optical fingerprint recognition.

Figure 29:
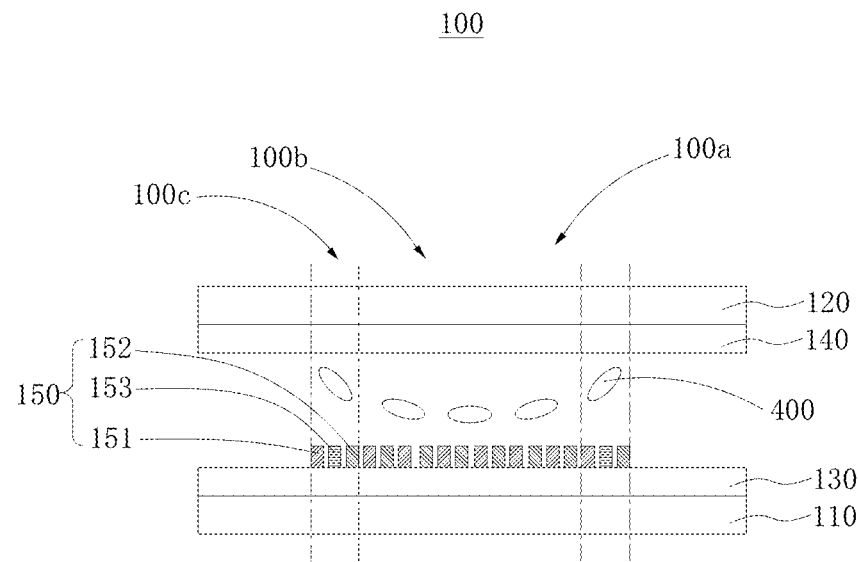
FIG. 29 is a cross-sectional structural schematic view of an electronic device according to further another embodiment of the present disclosure.

Referring to FIG. 29, a white color resist 153 may be further arranged at a part of the color resist layer 150 facing the edge region 100c.

Specifically, the white color resist 153 is arranged at a part of the color resist layer 150 corresponding to the edge region 100c. The white color resist 153 is configured to increase the brightness of the edge region 100c. The color resist layer 150 is not arranged with the white color resist 153 at a part corresponding to the central region 100b. Therefore, under same conditions, the brightness of the edge region 100c may be greater than the brightness of the central region 100b, thereby complementing the optical characteristics of the lens of the optical sensor 200, which is bright at the center and dark at the edges, improving the sharpness of the collected fingerprint image, and improving the sensitivity of fingerprint recognition.

Figure 30:
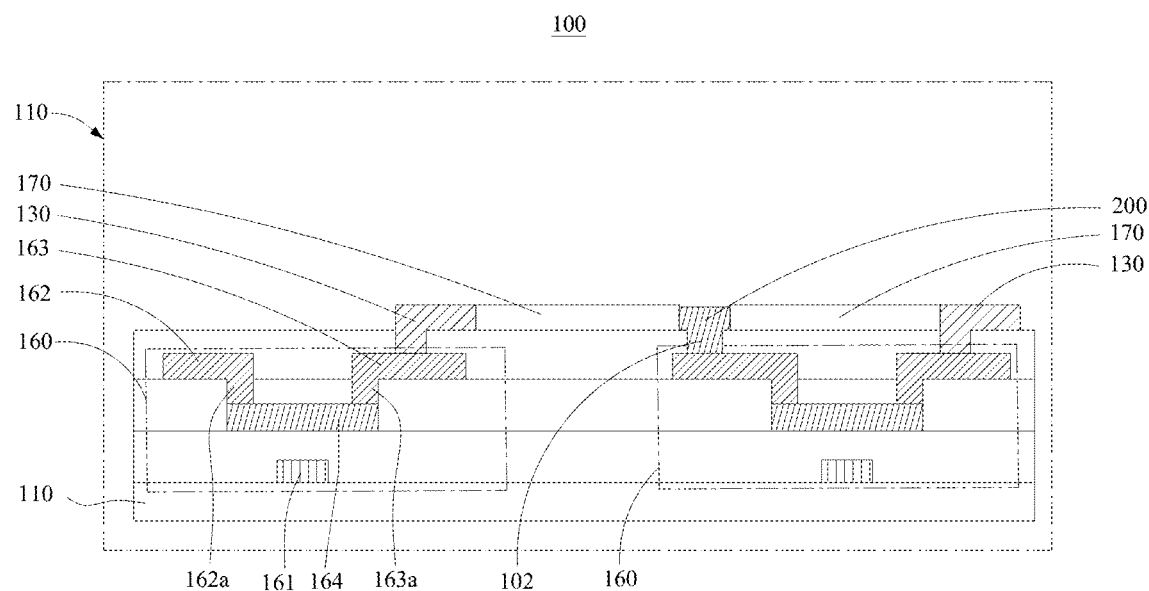
FIG. 30 is a cross-sectional structural schematic view of an electronic device according to further another embodiment of the present disclosure.

Referring to FIG. 30, the display panel 100 may further include an array substrate 110 and a color film substrate 120 that are stacked and spaced apart. The array substrate 110 is arranged with a pixel electrode 130 on a side adjacent to the color film substrate 120. The color film substrate 120 is arranged with a common electrode 140 on a side adjacent to the array substrate 110.

The display panel 100 may further include a thin film transistor 160 on the array substrate 110. The color resist layer 150 and the thin film transistor 160 are both arranged on the array substrate 110.

Specifically, the color resist layer 150 includes a plurality of color resist units, and a black matrix 170 is arranged between adjacent color resist units. The black matrix 170 is configured to isolate adjacent color resist units to avoid collision of adjacent color resist units, ensuring the display quality of the display panel 100.

In some embodiment, the optical sensor 200 is arranged between two adjacent pixel electrodes 130.

The optical sensor 200 and the pixel electrode 130 are arranged in a same layer. The optical sensor 200 and the thin film transistor 160 electrically connected to the pixel electrode 130 share a part of a data line 102.

Specifically, the optical sensor 200 and the pixel electrode 130 may be formed together in a same process to reduce processes.

The thin film transistor 160 may include a gate 161, a first terminal 162, a second terminal 163, and a channel layer 164. The optical sensor 200 may include an input terminal 200a and an output terminal 200b. The first terminal 162 is electrically connected to the input terminal 200a. The second terminal 163 is electrically connected to a data line 102 of the green color resistor 151. The output terminal 200b is electrically connected to another data line 102 of the green color resistor 151. The first terminal 162 is a source 162a, and the second terminal 163 is a drain 163a; alternatively, the first terminal 162 is a drain 162a, and the second terminal 163 is a source 163a. The source 162a and the drain 163a are spaced apart and contact the channel layer 164 respectively. In the present disclosure, the first terminal 162 is the source 162a and the second terminal 163 is the drain 163a, as an example for description. The data line 102 of the green color resistor 151 and the drain 163a are arranged in a same layer. The optical sensor 200 is electrically connected to the data line 102 to realize a multiplexing of the data line 102 for a thin and light design of the electronic device. In the embodiments, it is illustrated that the data line 102 is arranged above the first terminal 162 of the thin film transistor 160. It is understood that the data line 102 and the first terminal 162 of the thin film transistor 160 may also be arranged in a same layer.

Further, the black matrix 170 is arranged between the adjacent optical sensor 200 and pixel electrode 130. The black matrix 170 is configured to shield the data line 102 shared by the optical sensor 200 and the thin film transistor 160, preventing the data line 102 from being exposed to an outside, thereby ensuring the consistency of the appearance of the electronic device.

Figure 31:
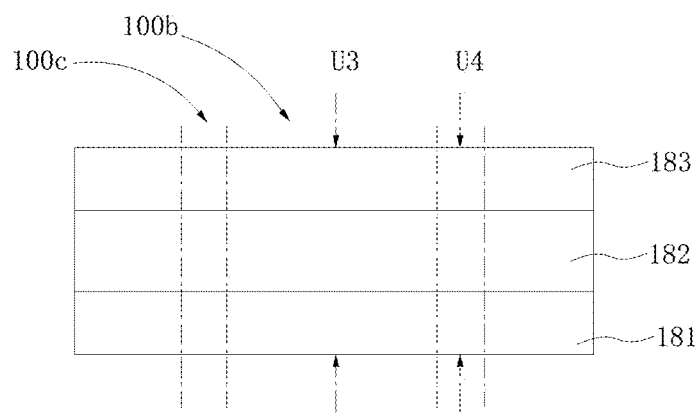
FIG. 31 is a cross-sectional structural schematic view of an electronic device according to further another embodiment of the present disclosure.

Referring to FIG. 31, the display panel 100 may further include an anode layer 181, a light-emitting layer 182, and a cathode layer 183 stacked in sequence. A driving voltage is applied between the anode layer 181 and the cathode layer 183 to cause the light-emitting layer 182 to emit light. The controller 300 may be configured to control the a part of light-emitting layer 182 corresponding to the central region 100b to be loaded with a first voltage U3, and control a part of the light-emitting layer 182 corresponding to the edge region 100c to be loaded with a second voltage U4. The voltage value of the first voltage U3 is less than the voltage value of the second voltage U4.

The display panel 100 may be a flexible display panel 100.

Specifically, parts of the light-emitting layer 182 corresponding to different regions of the fingerprint recognition region 100a are controlled with independent driving voltages. When the voltage value of the first voltage U3 applied to a part of the light-emitting layer 182 corresponding to the central region 100b of the fingerprint recognition region 100a is less than the voltage value of the second voltage U4 applied to a part of the light-emitting layer 182 corresponding to the edge region 100c of the finger print recognition region 100a, a light-emitting brightness of the part of the light-emitting layer 182 corresponding to the central region 100b is less than that of the part of the light-emitting layer 182 corresponding to the edge region 100c under same other conditions, thereby improving the sharpness of the collected fingerprint image and thus the sensitivity of fingerprint recognition.

Figure 32:
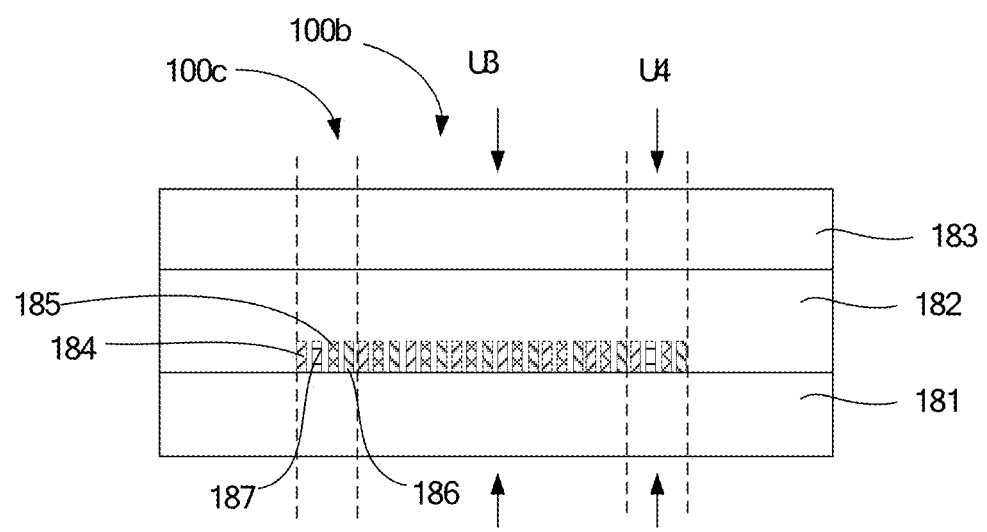
FIG. 32 is a cross-sectional structural schematic view of an electronic device according to further another embodiment of the present disclosure.

Referring to FIG. 32, the light-emitting layer 182 may be arranged with a red sub-pixel 187, a green sub-pixel 184, and a blue sub-pixel 185 at a part facing the central region 100b. The light-emitting layer 182 may be arranged with a red sub-pixel 187, a green sub-pixel 184, a blue sub-pixel 185, and a white sub-pixel 186 at a part facing the edge region 100c. When the optical sensor 200 collects the fingerprint image of the target object, the controller 300 is configured to control the red sub-pixels 187 of the central region 100b and the edge region 100c not to emit light.

Specifically, the green sub-pixel 184 is arranged at the corresponding part of the fingerprint recognition region 100a, such that the background noise of the display panel 100 and the collected fingerprint image may be more balanced, while the blue sub-pixel 185 may make the contrast of the collected fingerprint image more obvious. Therefore, the green sub-pixel 184 and blue sub-pixel 185 are arranged at intervals, thereby increasing the contrast of the collected fingerprint image, improving the quality of the collected fingerprint image, and further improving the accuracy of optical fingerprint recognition.

In some embodiments, a light-emitting area of the green sub-pixel 184 and that of the blue sub-pixel 185 remain the same. In this way, the noise of the collected fingerprint image may be less, and the contrast may be higher, such that the collected fingerprint image is more coordinated, improving the accuracy of the optical fingerprint recognition.

The light-emitting layer 182 may be further arranged with a white sub-pixel 186 at a part facing the edge region 100c.

Specifically, a part of the light-emitting layer 182 corresponding to the edge region 100c is arranged with the white sub-pixel 186. The white sub-pixel 186 is configured to increase the brightness of the edge region 100c. A part of the light-emitting layer 182 corresponding to the central region 100b is not arranged with the white sub-pixel 186. Therefore, under same conditions, the brightness of the edge region 100c may be greater than the brightness of the center region 100b, thereby complementing the optical characteristics of the lens of the optical sensor 200, which is bright at the center and dark at the edges, improving the sharpness of the collected fingerprint image, and further improving the sensitivity of fingerprint recognition.

Figure 33:
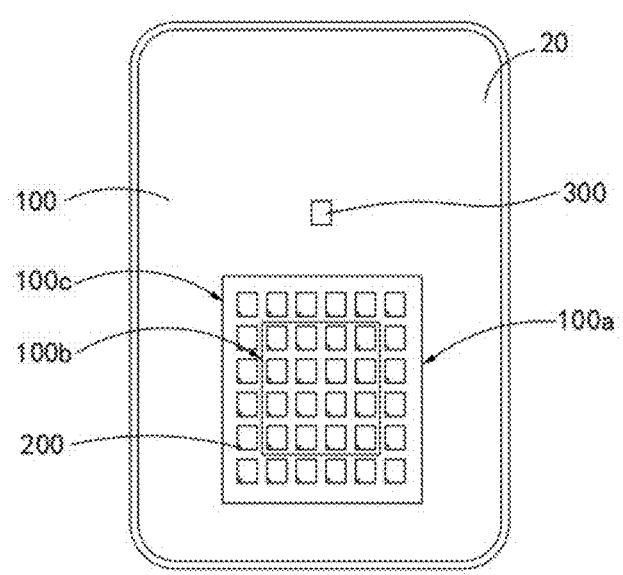
FIG. 33 is a structural schematic view of an electronic device according to further another embodiment of the present disclosure.

Referring to FIG. 33, the electronic device 1 may further include a cover 20. When performing fingerprint image collection, the optical sensor 200 is configured to receive target light incident from the cover 20. The target light carries fingerprint information of the target object. The optical sensor 200 is configured to convert the target light carrying the fingerprint information of the target object into an electric signal carrying the fingerprint information of the target object. The controller 300 is configured to generate a fingerprint image of the target object based on the electric signal carrying the fingerprint information of the target object. The controller 300 is configured to compare the fingerprint image of the target object with a preset fingerprint image to determine whether the fingerprint image of the target object matches the preset fingerprint image.

The above is the implementation of the embodiments of the present disclosure. It should be noted that for those skilled in the art, without departing from the principle of the embodiments of the present disclosure, several improvements and modifications can be made, which shall also be within the scope of the present disclosure.

What is claimed is:

1. An electronic device, comprising:
   a display panel, comprising a fingerprint recognition region, the fingerprint recognition region comprising:
     a central region; and
     an edge region surrounding the central region;
   an optical sensor, configured to collect a fingerprint image of a target object and comprising a plurality of photosensitive units, wherein a projection of the optical sensor on the display panel along a direction perpendicular to the display panel is within the fingerprint recognition region; and
   a controller, configured to control photosensitive performance of at least one photosensitive unit corresponding to the edge region to be better than photosensitive performance of at least one photosensitive unit corresponding to the central region;
   wherein the controller is further configured to adjust a brightness of the display panel corresponding to the plurality of photosensitive units to a target brightness, and record an adjustment time for adjusting the brightness of the display panel to the target brightness; in response to the plurality of photosensitive units being required to be turned on next time, the controller is further configured to adjust the brightness of the display panel based on the adjustment time.

2. The electronic device according to claim 1, wherein the photosensitive performance of a corresponding photosensitive unit is at least determined by a gain of the corresponding photosensitive unit and is proportional to the gain; the controller is further configured to control the gain of the at least one photosensitive unit corresponding to the edge region to be greater than the gain of the at least one photosensitive unit corresponding to the central region.

3. The electronic device according to claim 2, wherein the number of the at least one photosensitive unit corresponding to the edge region is more than one, and the number of the at least one photosensitive unit corresponding to the central region is more than one; the gains of the at least one photosensitive unit corresponding to the edge region are same; the gains of the at least one photosensitive unit corresponding to the central region are same.

4. The electronic device according to claim 2, wherein the fingerprint recognition region further comprises a boundary region arranged between the central region and the edge region; the plurality of photosensitive units further comprise at least one photosensitive unit corresponding to the boundary region; the controller is further configured to control the gain of the at least one photosensitive unit corresponding to the boundary region to be an average value of the gain of the at least one photosensitive unit corresponding to the edge region and the gain of the at least one photosensitive unit corresponding to the central region.

5. The electronic device according to claim 2, wherein the controller is further configured to control the gain of each of the at least one photosensitive unit corresponding to the central region to gradually increase in a direction from the central region to the edge region, and to control the gain of each of the at least one photosensitive unit corresponding to the edge region to gradually increase in the direction from the central region to the edge region; wherein the gain of each of the at least one photosensitive unit corresponding to the central region is less than the gain of each of the at least one photosensitive unit corresponding to the edge region.

6. The electronic device according to claim 1, wherein the photosensitive performance of a corresponding photosensitive unit is at least determined by a gain of the corresponding photosensitive unit and is proportional to the gain; the electronic device further comprises a filtering unit and an amplifying unit; each of the plurality of photosensitive units is configured to receive a detection signal; the filtering unit is configured to filter out a clutter in the detection signal; the amplifying unit is configured to amplify the amplitude of the detection signal from which the clutter has been filtered out; the gain of the each of the plurality of photosensitive units is proportional to an amplification factor of the amplifying unit.

7. The electronic device according to claim 1, wherein the photosensitive performance of a corresponding photosensitive unit is further determined by an exposure duration of the corresponding photosensitive unit and is proportional to the exposure duration; the controller is further configured to control the exposure duration of each of the at least one photosensitive unit corresponding to the edge region to be greater than the exposure duration of each of the at least one photosensitive unit corresponding to the central region.

8. The electronic device according to claim 7, wherein the controller is further configured to adjust the exposure duration and a gain of the each of the at least one photosensitive unit corresponding to the edge region to obtain a first parameter, and configured to adjust the exposure duration and the gain of the each of the at least one photosensitive unit corresponding to the central region to obtain a second parameter; a first image is obtained under the first parameter by the each of the at least one photosensitive unit corresponding to the edge region, and when a second image is obtained under the second parameter by the each of the at least one photosensitive unit corresponding to the edge region, the sharpness of the first image is greater than the sharpness of the second image.

9. The electronic device according to claim 1, wherein the photosensitive performance of corresponding photosensitive units is at least determined by an arrangement density of the corresponding photosensitive units and is proportional to the arrangement density; the arrangement density of the at least one photosensitive unit corresponding to the edge region is greater than the arrangement density of the at least one photosensitive unit corresponding to the central region, wherein the number of the at least one photosensitive unit corresponding to the edge region is greater than 1, and the number of the at least one photosensitive unit corresponding to the central region is greater than 1.

10. The electronic device according to claim 1, wherein the photosensitive performance of a corresponding photosensitive unit is at least determined by a sensitivity of the corresponding photosensitive unit and is proportional to the sensitivity; the controller is further configured to control the sensitivity of each of the at least one photosensitive unit corresponding to the edge region to be greater than the sensitivity of each of the at least one photosensitive unit corresponding to the central region.

11. The electronic device according to claim 1, wherein the controller is further configured to control the brightness of a light spot pattern displayed in the fingerprint recognition region when the display panel performs fingerprint recognition, such that the brightness of an edge region of the light spot pattern is greater than the brightness of a central region of the light spot pattern;
wherein the controller is configured to control the brightness of the edge region of the light spot pattern to gradually decrease in a direction approaching the central region of the light spot pattern, and control the brightness of the central region of the light spot pattern to be constant.

12. The electronic device according to claim 1, further comprising a detector; wherein when the detector detects that a target photosensitive unit of the plurality of photosensitive units has been damaged, the detector is configured to send a feedback signal, and the controller is configured to control an exposure duration of a first photosensitive unit of the plurality of photosensitive units adjacent to the target photosensitive unit to be greater than a first preset duration based on the feedback signal; the first preset duration is an exposure duration of the first photosensitive unit when the target photosensitive unit is not yet damaged.

13. The electronic device according to claim 12, wherein, in condition of the first photosensitive unit being arranged closer to the central region relative to the target photosensitive unit, the controller is further configured to control the exposure duration of the first photosensitive unit with a first increment based on the first preset duration;
in condition of the first photosensitive unit being arranged closer to the edge region relative to the target photosensitive unit, the controller is further configured to control the exposure duration of the first photosensitive unit with a second increment based on the first preset duration;
the first increment is less than the second increment.

14. The electronic device according to claim 12, wherein the plurality of photosensitive units further comprise a second photosensitive unit arranged adjacent to the target photosensitive unit; the first photosensitive unit is arranged closer to a center of the optical sensor relative to the second photosensitive unit; the controller is further configured to control an exposure duration of the second photosensitive unit to be greater than a second preset duration, wherein the first preset duration is less than the second preset duration, and the second preset duration is an exposure duration of the second photosensitive unit when the target photosensitive unit is not yet damaged.

15. The electronic device according to claim 1, wherein the plurality of photosensitive units comprise a target photosensitive unit, a first photosensitive unit and a second photosensitive unit, the first photosensitive unit and the second photosensitive unit being both arranged adjacent to the target photosensitive unit; in condition of the target photosensitive unit being damaged, the controller is further configured to perform fitting on a fingerprint pattern of the target object obtained by the first photosensitive unit and another fingerprint pattern of the target object obtained by the second photosensitive unit to obtain a fingerprint pattern corresponding to the target photosensitive unit.

16. The electronic device according to claim 1, wherein the display panel further comprises an anode layer, a light-emitting layer, and a cathode layer stacked in sequence; a driving voltage is applied between the anode layer and the cathode layer to cause the light-emitting layer to emit light; the light-emitting layer comprises a part corresponding to the edge region and a part corresponding to the central region; a projection of the part of the light-emitting layer corresponding to the edge region on the display panel along the direction perpendicular to the display panel is within the edge region; a projection of the part of the light-emitting layer corresponding to the central region on the display panel along the direction perpendicular to the display panel is within the central region; the controller is further configured to control the part of the light-emitting layer corresponding to the central region to be loaded with a first voltage and control the part of the light-emitting layer corresponding to the edge region to be loaded with a second voltage; the voltage value of the first voltage is less than the voltage value of the second voltage; the light-emitting layer is arranged with a red sub-pixel, a green sub-pixel and a blue sub-pixel at a part facing the central region and is arranged with a red sub-pixel, a green sub-pixel, a blue sub-pixel and a white sub-pixel at a part facing the edge region; when the optical sensor collects the fingerprint image of the target object, the controller is configured to control the red sub-pixel of the central region and the red sub-pixel of the edge region not to emit light.

17. The electronic device according to claim 1, wherein the optical sensor further comprises a plurality of lenses; each of the plurality of lenses is configured to focus light incident from the display panel to a corresponding photosensitive unit and then transmit the light to the corresponding photosensitive unit; a central region of the each of the plurality of lenses has a greater focus on light than an edge region of the each of the plurality of lenses does; a focus curve of the each of the plurality of lenses is complementary to a photosensitive performance curve of the corresponding photosensitive unit.

18. An electronic device, comprising:
a display panel, comprising a fingerprint recognition region, wherein the fingerprint recognition region comprises a central region and an edge region surrounding the central region;
an optical sensor, arranged corresponding to the fingerprint recognition region and configured to collect a fingerprint image of a target object and comprising a plurality of photosensitive units, wherein a projection of the optical sensor on the display panel along a direction perpendicular to the display panel is within the fingerprint recognition region; and
a controller, configured to control photosensitive performance of a region of the optical sensor corresponding to the edge region to be better than photosensitive performance of a region of the optical sensor corresponding to the central region;
wherein the controller is further configured to adjust a brightness of the display panel corresponding to the plurality of photosensitive units to a target brightness, and record an adjustment time for adjusting the brightness of the display panel to the target brightness; in response to the plurality of photosensitive units being required to be turned on next time, the controller is further configured to adjust the brightness of the display panel based on the adjustment time.

19. An electronic device, comprising:
a display panel, comprising a fingerprint recognition region, wherein the fingerprint recognition region comprises a central region and an edge region surrounding the central region;
an optical sensor, configured to collect a fingerprint image of a target object and comprising a plurality of photosensitive units, wherein a projection of the optical sensor on the display panel along a direction perpendicular to the display panel is within the fingerprint recognition region; the plurality of photosensitive units comprise at least one photosensitive unit corresponding to the edge region and at least one photosensitive unit corresponding to the central region; a projection of each of the at least one photosensitive unit corresponding to the edge region on the display panel along the direction perpendicular to the display panel is within the edge region; a projection of each of the at least one photosensitive unit corresponding to the central region on the display panel along the direction perpendicular to the display panel is within the central region; and
a controller, configured to control photosensitive performance of the at least one photosensitive unit corresponding to the edge region to be better than photosensitive performance of the at least one photosensitive unit corresponding to the central region;
wherein the controller is further configured to adjust a brightness of the display panel corresponding to the plurality of photosensitive units to a target brightness, and record an adjustment time for adjusting the brightness of the display panel to the target brightness; in response to the plurality of photosensitive units being required to be turned on next time, the controller is further configured to adjust the brightness of the display panel based on the adjustment time.

\* \* \* \* \*